(12) United States Patent
Schein

(10) Patent No.: US 7,051,031 B2
(45) Date of Patent: May 23, 2006

(54) METHOD, SYSTEM, AND PROGRAM FOR MANAGING ACCESSES TO DATA OBJECTS BY MULTIPLE USER PROGRAMS OVER A NETWORK

(75) Inventor: Phillip Mark Schein, Broomfield, CO (US)

(73) Assignee: SUN Microsystems, Inc., Palo Alto, CA (US)

( * ) Notice: Subject to any disclaimer, the term of this patent is extended or adjusted under 35 U.S.C. 154(b) by 736 days.

(21) Appl. No.: 09/973,784

(22) Filed: Oct. 9, 2001

(65) Prior Publication Data

US 2004/0107405 A1    Jun. 3, 2004

(51) Int. Cl.
*G06F 17/30* (2006.01)

(52) U.S. Cl. .......................... 707/10; 707/200; 715/530

(58) Field of Classification Search ............. 707/1, 707/10, 100, 101, 102, 200, 201, 203; 715/513, 715/530; 709/201, 203
See application file for complete search history.

(56) References Cited

U.S. PATENT DOCUMENTS

| 5,008,853 | A | | 4/1991 | Bly et al. ................... 345/751 |
|---|---|---|---|---|
| 5,220,657 | A | | 6/1993 | Bly et al. ................... 711/152 |
| 5,247,615 | A | | 9/1993 | Mori et al. ................. 709/205 |
| 5,293,619 | A | | 3/1994 | Dean .......................... 707/204 |
| 5,379,374 | A | | 1/1995 | Ishizaki et al. ............. 345/759 |
| 5,446,842 | A | | 8/1995 | Schaeffer et al. ........... 709/205 |
| 5,515,491 | A | | 5/1996 | Bates et al. ................. 345/754 |
| 5,649,089 | A | * | 7/1997 | Kilner ........................... 714/6 |
| 5,799,320 | A | | 8/1998 | Klug ........................... 707/201 |
| 5,890,177 | A | | 3/1999 | Moody et al. ............... 715/511 |
| 5,966,512 | A | | 10/1999 | Bates et al. ................. 709/205 |
| 6,044,387 | A | | 3/2000 | Angiulo et al. ............. 715/533 |
| 6,067,551 | A | | 5/2000 | Brown et al. ............... 707/203 |
| 6,073,161 | A | | 6/2000 | DeBoskey et al. .......... 709/200 |
| 6,088,702 | A | | 7/2000 | Plantz et al. ............ 707/103 R |
| 6,266,675 | B1 | * | 7/2001 | Evans et al. ............. 707/104.1 |
| 6,366,933 | B1 | * | 4/2002 | Ball et al. ................... 715/511 |

(Continued)

OTHER PUBLICATIONS

Bemers-Lee, T., and D. Connolly. "Hypertext Markup Language- 2.0- Forms". [online], Sep. 22, 1995. [Retreived on Oct. 5, 2002]. Retrieved from the Internet at <URL: http://www.w3.org/MarkUp/html-spec/html-spec_8.htm;#SEC8>.

(Continued)

*Primary Examiner*—Greta Robinson
(74) *Attorney, Agent, or Firm*—Chapin IP Law, LLC; Barry W. Chapin, Esq.

(57) ABSTRACT

Provided is a method, system, and program for managing access to data objects by multiple user programs over a network. A page is generated including at least one editable field of data from at least one data object. An initial value is calculated from the at least one data object and the page and the initial value are transmitted to one user program over the network. The page and the initial value are received from the user program, wherein the received page includes modified data in at least one editable field. A current value is calculated from the at least one data object after receiving the page and a determination is made as to whether the initial value transmitted with the received page is different than the current value. If the initial and current values match, then the data object is updated with the modified data included in the received page.

48 Claims, 20 Drawing Sheets

U.S. PATENT DOCUMENTS

| | | |
|---|---|---|
| 6,553,388 B1 * | 4/2003 | Perks .......................... 707/201 |
| 2001/0011274 A1 * | 8/2001 | Klug et al. .................... 707/9 |
| 2002/0013825 A1 * | 1/2002 | Freivald et al. ............. 709/218 |
| 2003/0033241 A1 * | 2/2003 | Harari .......................... 705/38 |

OTHER PUBLICATIONS

Panagiotis, Christias. "Unix Man Pages: Sum (1B)." [online], Copyright 1999 Man -cgi 2.00. [Retrieved Sep. 3, 2001]. Retrieved from the Internet at <URL: http://www/ntua.gr/cgi-bin/man-cgi?sum+1B>.

U.S. Appl. No. 09/973,889, filed on Oct. 9, 2001, entitled, "Method, System, and Program for Managing Information for an Application Program Using a File Management System", invented by P.M. Schein.

* cited by examiner

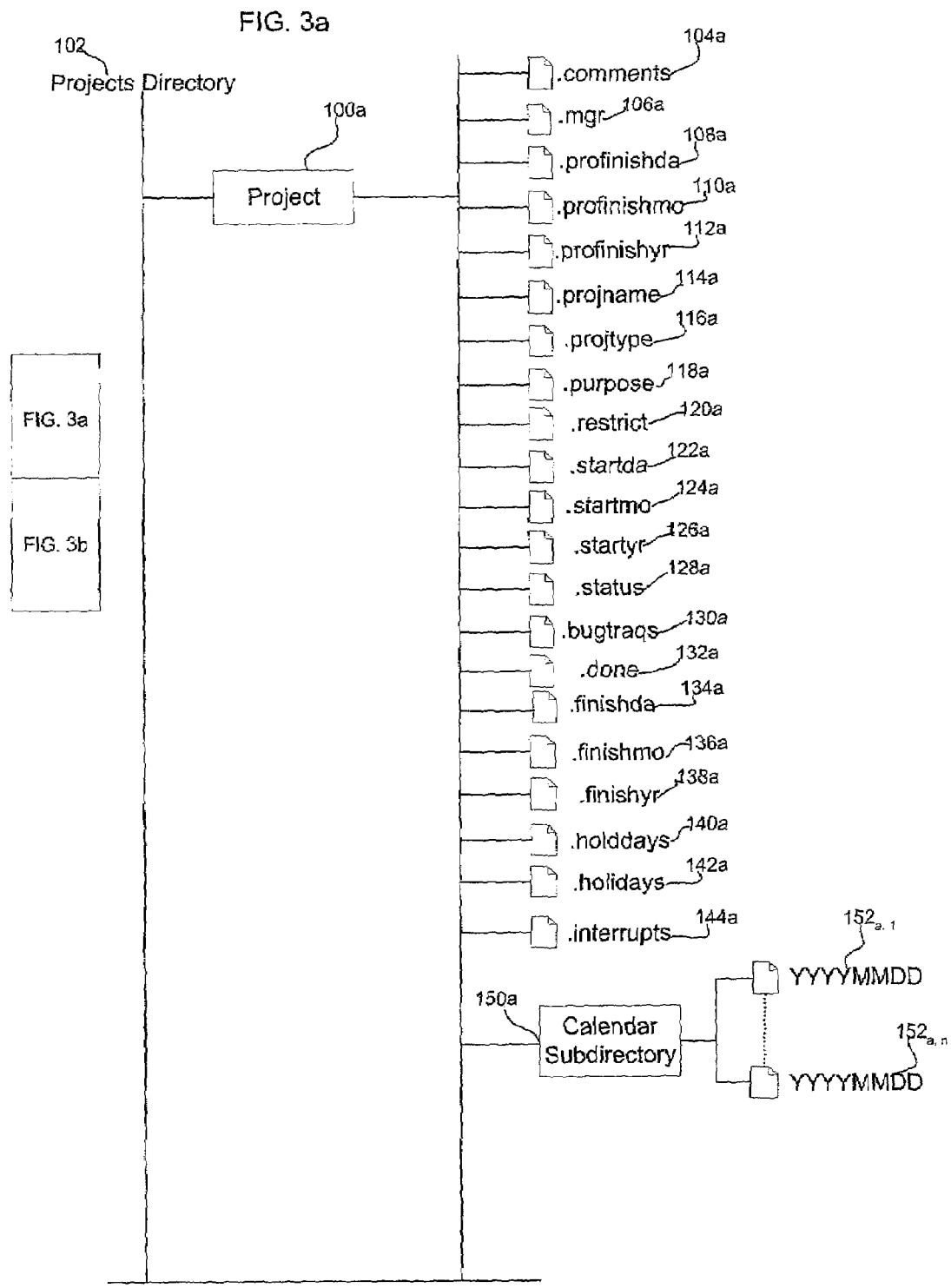

FIG. 6

Summary of Interrupts

| Project | Type of Delay | Date | Duration days | Comments |
|---|---|---|---|---|
| Project 1 | Interruption | 04/08/1991 | 2 | Power outage in lab |
| Project 1 | Holiday | 07/04/2001 | 4 | July 4th |
| Project 3 | Setup | 08/03/2001 | 3 | Time to setup equipment in lab |

Home Page

Add New Interrupt

FIG. 9

Completed Projects

Completed Projects

| Project | Status | Comments |
|---|---|---|
| Project 1<br>Edit<br>Calendar Status | Completed<br>Details | Comments for test project 1.<br><br>Project Purpose: Design software<br><br>Project Manager: Joe Smith<br>Date Started: 03/01/1999<br>Date Finished: 05/03/2000 |
| Project 2<br>Edit<br>Calendar Status<br>Details | Completed<br>Details | Comments for test project 2.<br><br>Project Purpose: Design software<br><br>Project Manager: Joe Jones<br>Date Started: 05/01/2000<br>Date Finished: 04/03/2001 |

FIG. 10

Details View

Task Project Status

| Task Area (Click on Task Name to Edit) | Task On Time | % Done | Bugs Filed | Comments |
|---|---|---|---|---|
| Entrance Criteria Met | On schedule | 33 | 3 | On time, bob is handling |
| Systems and Hardware setup | behind schedule | 5 | 1 | Late start |
| Fault Injection testing | Not started | 0 | 0 | 0 |
| | | | | |

FIG. 13

Calendar Status of Project

Project Calendar for
August

| Sunday | Monday | Tuesday | Wednesday | Thursday | Friday | Saturday |
|--------|--------|---------|-----------|----------|--------|----------|
|        |        | 01<br><br>One day interrupt for vacation day. | 02 | 03 | 04 | 05 |
| 06     | 07     | 08      | 9<br><br>Added interrupt for power delay | 10 | 11 | 12 |

METHOD, SYSTEM, AND PROGRAM FOR MANAGING ACCESSES TO DATA OBJECTS BY MULTIPLE USER PROGRAMS OVER A NETWORK

BACKGROUND OF THE INVENTION

1. Field of the Invention

The present invention relates to a method, system, and program for managing accesses to data objects by multiple user programs over a network.

2. Description of the Related Art

In network environments where multiple users can access a single file, the file system includes a locking scheme to manage access to a file to maintain data integrity and avoid consistency problems by preventing two or more users from simultaneously modifying a file. Many application programs, such as database programs, also employ a locking scheme to maintain data integrity by preventing multiple users from modifying application data in a manner that will harm data consistency. For instance, database programs perform locking on a record-by-record basis to prevent multiple users from simultaneously modifying the same record.

In many systems, once a user has an exclusive lock on a file, that user can prevent others from modifying the file for a significant amount of time until the user releases the lock. One problem with such systems is that after obtaining a lock, the user may delay performing the intended modification and during such delay prevent other applications from modifying the data.

Moreover, locking schemes also require that the file system or application program manage various data structures to keep track of the users that maintain a lock and other users that should receive the lock upon its release, as well as timeout a lock if the holder of the lock has not performed any action within a predetermined time period. The burden of managing locks increases as the number of files or records that can be separately locked increases.

For all these reasons, there is a need in the art for improved data object locking schemes.

SUMMARY OF THE PREFERRED EMBODIMENTS

Provided is a method, system, and program for managing access to data objects by multiple user programs over a network. A page is generated including at least one editable field of data from at least one data object. An initial value is calculated from the at least one data object and the page and the initial value are transmitted to one user program over the network. The page and the initial value are received from the user program, wherein the received page includes modified data in at least one editable field. A current value is calculated from the at least one data object after receiving the page and a determination is made as to whether the initial value transmitted with the received page is different than the current value. If the initial and current values match, then the data object is updated with the modified data included in the received page.

Further, the data object is not updated with the modified data in the received page if the initial and current values do not match.

In further implementations, the page includes multiple editable fields and each of the editable fields correspond to one of a plurality of data objects. In such case, the value is calculated from the plurality of the data objects, whereby a modification to one of the plurality of data objects between a time the initial value and current value are calculated will cause the initial value to differ from the current value.

In still further implementations, the page includes multiple editable fields and each of the editable fields corresponds to one of a plurality of data objects. In such case, calculating the initial value further comprises calculating a plurality of initial values, wherein each initial value is calculated from at least one data object corresponding to at least one editable field in the page. Further, calculating the current value further comprises calculating a plurality of current values, wherein each current value is calculated from at least one data object corresponding to at least one editable field in the page. Still further, determining whether the initial value transmitted with the received page is different than the current value is performed for each of the plurality of initial and current values and updating the data object with the modified data included in the received page further comprises updating each data object used in the calculation of the matching initial and current values with the modified data included in the received page.

In still additional implementations, information is generated on groups of the data objects corresponding to editable fields in the page, wherein each group comprises at least one data object corresponding to one editable field in the page. In such case, one initial value is calculated for each group from the data objects in the group.

BRIEF DESCRIPTION OF THE DRAWINGS

Referring now to the drawings in which like reference numbers represents corresponding parts throughout:

FIGS. 3a and 3b illustrate a file management architecture used with a project management program in accordance with certain implementations of the invention;

FIG. 6 illustrates a GUI panel displaying project related interrupt information the file management architecture of FIGS. 3a, b in accordance with certain implementations of the invention;

FIG. 9 illustrates a GUI panel displaying information generated according to the logic of FIGS. 8a and 8b in accordance with certain implementations of the invention;

FIG. 10 illustrates a GUI panel displaying task information generated in accordance with certain implementations of the invention;

FIG. 13 illustrates a GUI panel displaying project calendar information in the file management architecture of FIGS. 3a, b in accordance with certain implementations of the invention;

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Using A File Directory Implementing an Information Management System

Figure 1:
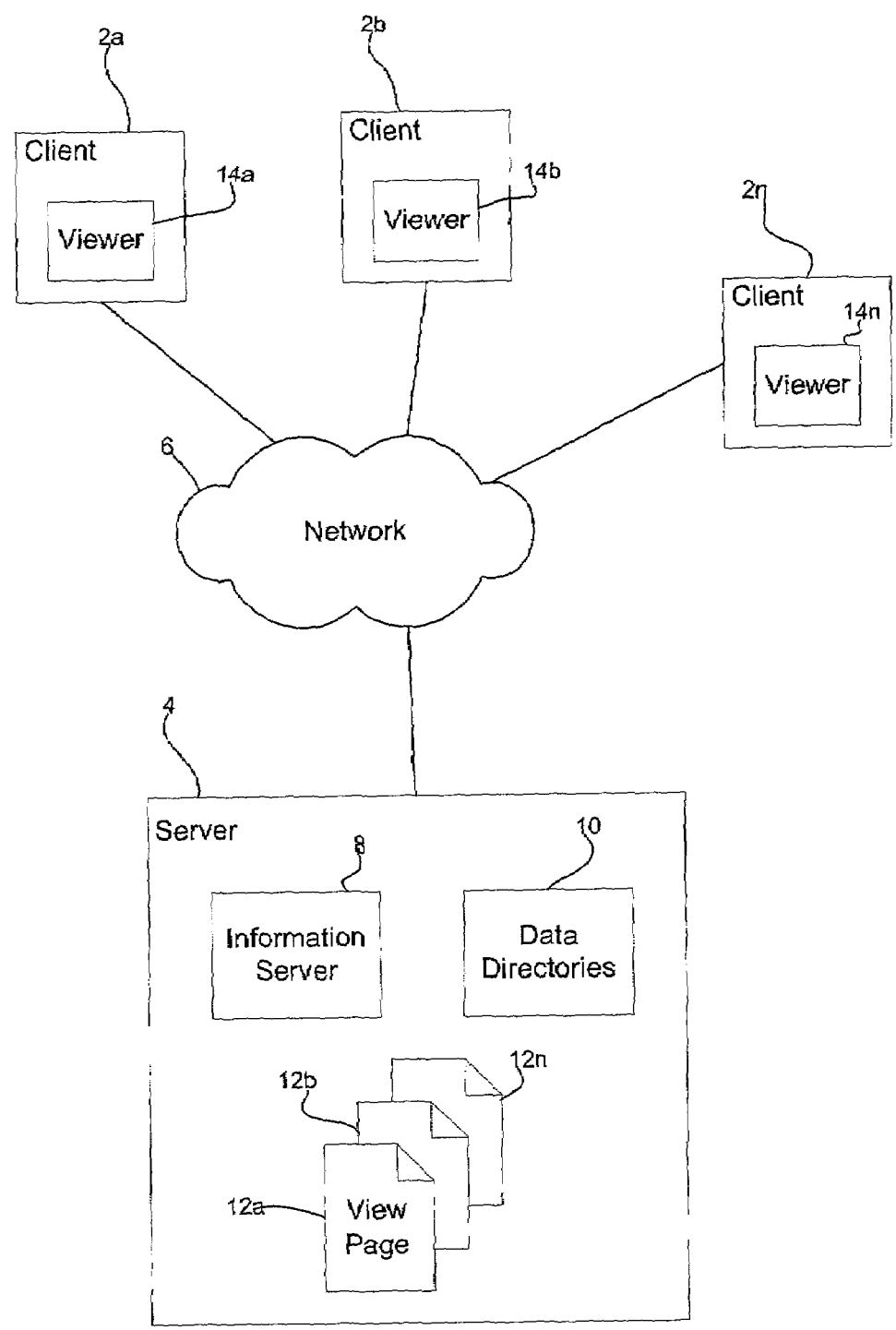
FIG. 1 illustrates a network computing environment in which aspects of the invention are implemented.

FIG. 1 illustrates a network computing environment in which aspects of the invention are implemented. A plurality of client computers 2a, b . . . n and a server computer 4 communicate over a network 6, such as a Local Area Network (LAN), Wide Area Network (WAN), the Internet, an Intranet, etc., using a network protocol known in the art, e.g., Ethernet, Fibre Channel, TCP/IP, HyperText Transfer Protocol (HTTP), File Transfer Protocol (FTP), etc. The server 4 includes an information server 8 program that provides access to data maintained in a data directories 10. The information server 8 would access data from the data directories 10 and insert the data into view pages 12a, b . . . n that provide a predefined view of the data in the data directories 10. For instance, if the information server 8 implements an e-mail program, then one view 12a, b . . . n may comprise all the messages in an "inbox"; if an accounting program, then the view pages 12a, b . . . n may provide a view of financial information; if a project management program, then the view pages 12a, b . . . n may provide information on projects being monitored, etc. The clients 2a, b . . . n further include viewer programs 14a, b . . . n, which may comprise any type of program capable of viewing documents known in the art, such as an HTML web browser, word processing program, or any document management program known in the art to render pages of data and enable the user to interact with the server through the graphical elements and data entry fields in the displayed page. In HTML implementations, a user may use the viewer 14a, b . . . n to request information from another view page 12a, b . . . n by selecting a hypertext link on the current displayed page 12a, b . . . n to access another view page 12a, b . . . n of further information in the data directories 10.

In certain implementations, the view pages 12a, b . . . n may comprise HTML or Extensible Markup Language (XML) pages including hypertext links to other view pages 12a, b . . . n. Additionally, the view pages 12a, b . . . n may be implemented in alternative multi-media formats, such as Joint Photographic Experts Group (JPEG), the Adobe Portable Document Format (PDF), PostScript, tagged image file format (TIFF), etc. In such case the viewer 14a, b . . . n would include the capability to render such alternative view page 12a, b . . . n media format. In response to a request from one viewer 14a, b . . . n for a particular view at a universe resource locator (URL) address, the information server 8 would access the data designated to be inserted into the requested view page 12a, b . . . n from the data directories 10 in the manner described below and insert the accessed into the designated field in the view page 12a, b . . . n. The information server 8 would then return the filled-in view page 12a, b . . . n to the requesting client 2a, b . . . n.

**Abode and PostScript are trademarks of Abode Systems, Inc.

The clients 2a, b . . . n include viewer programs 14a, b . . . n, such as an HTML browser capable of downloading and rendering a page 12a, b . . . n of content from the server 4 using a network transfer protocol, such as HTTP, etc. The clients 2a, b . . . n may comprise any computing device known in the art, such as a personal computer, workstation, laptop computer, hand held computer, telephony device, mainframe, server, etc. The server 4 comprises a server-class machine or any other type of computing device capable of responding to data requests from the clients 2a, b . . . n.

In certain implementations, the data directories 10 store user data across a plurality of files. For instance, a type of data maintained by the information manager 8 may be categorized as part of an information class, e.g., a project for which information is maintained in a project manager program; a type of e-mail box in an e-mail program; a category of accounting information (e.g., expense, income, equity, etc.). Each instance of the class would include related information, such as attribute values of the general class, where the attribute values may differ among the information class instances.

Figure 2:
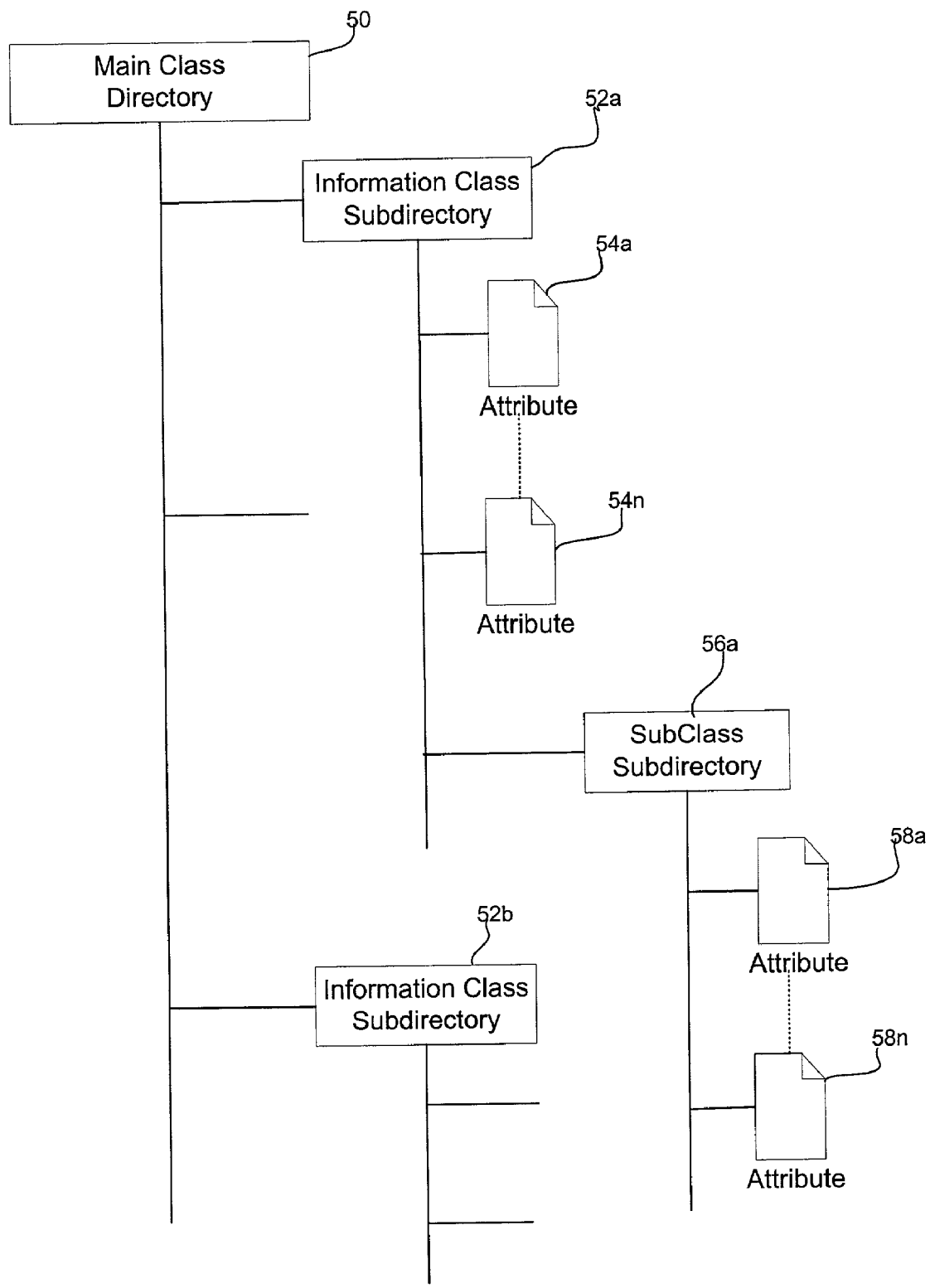
FIG. 2 illustrates a diagram of the file management architecture in accordance with certain implementations of the invention.

FIG. 2 illustrates an arrangement of the data directories 10 where the data managed by the information server 8 comprises an information class having a main class directory 50. A subdirectory 52a . . . n is provided for each instance of the information class, e.g., project, e-mail box, etc. The subdirectory 52a . . . n includes attribute files 54a . . . n that include the values for the attributes of the instance of the information class. Thus, the attributes of a class instance are stored in the attribute file 54a . . . n provided for the attribute. The attribute data may be embedded in the attribute file name 54a . . . n or stored within the attribute file. Each class instance further includes a subclass. A subclass subdirectory 56a . . . n is generated for each information class instance 52a . . . n. The subclass 56a includes attribute files 58a . . . n that provide the attribute values for the subclass. Each information class may include multiple subclasses, although only one is shown in FIG. 2. In this way, all the data that the information server 8 makes available to requesting clients 2a, b . . . n is dispersed through separate attribute files that are organized into subdirectories based on the class or subclass of information to which they are associated.

For instance, the general class directory 50 may comprise a calendar and each calendar instance may comprise a day, such that each subdirectory 52 is an instance of one day; the class may comprise an e-mail message for a particular e-mail box and the instance would comprise the type of e-mail box, e.g., send, drafts, inbox, delete, etc.

In one implementation, the information server 8 comprises a project manager. One general class would comprise a project class, and each instance provides information on a particular project. There would be a separate subdirectory for each project instance. Following are some examples of attribute files that provide the attribute values for each project class instance. The following names comprise the file extensions used for the attribute files.

.comments: provides user entered comments for one project.

.mgr: provides the name of the project manager, name can be embedded in the file name, e.g., "jonsmith.mgr"

.profinishda, .profinishmo, profinishyr: Indicates the projected finish or completion date.

.projname: the name of the project.

.projtype: indicates the type of project.

.purpose: identifies the purpose of the object.

.restrict: limits access to the information that is displayed unless a password is provided.

.startda, .startmo, .startyr: each file provides an attribute of the start date day, month, and year. If the start date is less than or equal to the current date, then the project is active or completed, otherwise, the project is a future project.

.status: contains the status of the project, which may be represented as a certain color or a combination of coloring and text.

.bugtraqs: indicates the number of bugs reported.

.done: indicates the percent of the project that has completed.

.finishda, .finishmo, .finishyr: each file provides an attribute of the finish day, month, and year of the project.

.holddays: number of days project put on hold.

.holidays: number of days holidays that occurred during projects.

.interrupts: a file including information on each interrupt to the project.

FIGS. 3*a*, *b* illustrate an implementation of the architecture of the data directories 10 (FIG. 1) when the information server 8 implements a project manager. Each of the above described files are maintained in a project subdirectory 100*a* . . . *n* for a project instance. The project subdirectories 100*a*, for one software project, includes the above mentioned attribute files 104*a*, 106*a* . . . 144*a*. Additional project instances, e.g., 100*b*, would also include the same attribute files 104*b* . . . 144*b*, but are capable of having different attribute values. Each project instance subdirectory 100*a*, *b* . . . *n* further includes a calendar subdirectory 150*a*, *b* . . . *n*. The calendar subdirectory 150*a*, *b* . . . *n* includes a file $152_{a,1} \ldots 152_{a,n}$ for each of the n days for which there is project information to display in the project calendar. The files $152_{a,1} \ldots 152_{a,n}$, for the days have a name that designates the year, month, and day (YYYYMMDD) of the day for which the file provides data. The day files $152_{a,1} \ldots 152_{a,n}$ may include images, hypertext links, text, etc.

Further provided is a details subdirectory 154*a*, *b* . . . *n* (FIG. 3*b*) providing information on tasks associated with a project directory 100*a*, *b* . . . *n* in which the particular details subdirectory 154*a*, *b* . . . *n* is included. The details subdirectory 154*a*, *b* . . . *n* includes one or more task subdirectories $156_{a,1} \ldots 156_{a,n}$ for each task defined for a project 100*a* . . . *n*. Each task subdirectory $156_{a,1} \ldots 156_{a,n}$ includes a plurality of attribute files providing attribute information on the task, including a status file, e.g. 158*a*, providing information on the current status of the task, such as on-time, late, delayed, quality, etc.; a done file, e.g. 160*a*, indicating the percentage completed of the task; and a .numbugs file, e.g. 162*a*, indicating a number of bugs reported for the particular task. In this way, a user may further divide a project into particular tasks for which information may be maintained and presented, thereby further segmenting and providing a lower level of detail of information on the project.

Additional project instance subclass directories 100*b* . . . *n* (shown in FIG. 3*b*) may also be included, having the project attribute files 104*b* . . . 144*b*, . . . , 104*n* . . . 144*n*, calendar subdirectory 150*b* . . . *n*, and day files 152*b*, 1 . . . $152_{b,n}, \ldots, 152_{n,1} \ldots 152_{n,n}$. As discussed, the attribute values may be implemented as data within the file or as data within the file name, followed by the file extension names described above. In this way, each discrete type of information that may be provided for an instance of a class type, e.g., project name, is implemented as a separate file.

Figure 4:
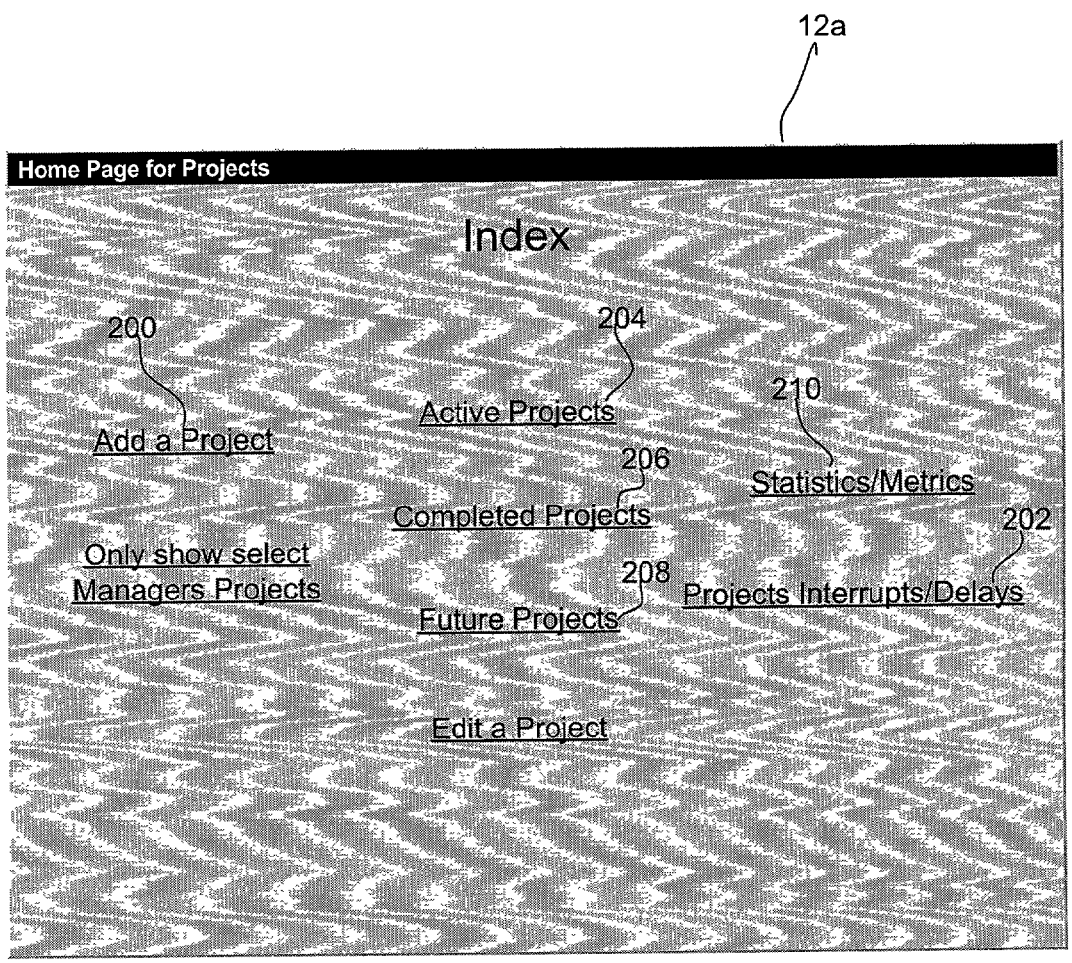
FIG. 4 illustrates a graphical user interface (GUI) panel to provide access to views of the data stored in the file management architecture of FIGS. 3a, b in accordance with certain implementations of the invention.

The information server 8 would receive requests from the viewers 14*a*, *b* . . . *n* for a view page 12*a*, *b* . . . *n* providing access to project data in the data directories 10 or a page that includes fields in which the user may enter data for a project that will be stored in subdirectories and files of the data directories 10. FIG. 4 illustrates a home view page 12*a* that the information server 8 would initially transmit to a client 2*a*, *b* . . . *n* that provides access through hypertext links to other of the view pages 12*b* . . . *n*. A client selection of the "Add a Project" link 200 would cause the information server 8 to return a page to the client 2*a*, *b* . . . *n* including fields in which the client can enter attributes of a new project, where each entered attribute would be stored in one attribute file 104*a* . . . 144*a*.

To return a view page 12*b* . . . *n* including project data from the data directories 10, the information server 8 would access the data in the subdirectory files in a predefined manner to access particular information to insert into a user requested view 12*b* . . . *n* to return to render in the client viewer 14*a*, *b* . . . *n*.

Figure 5:
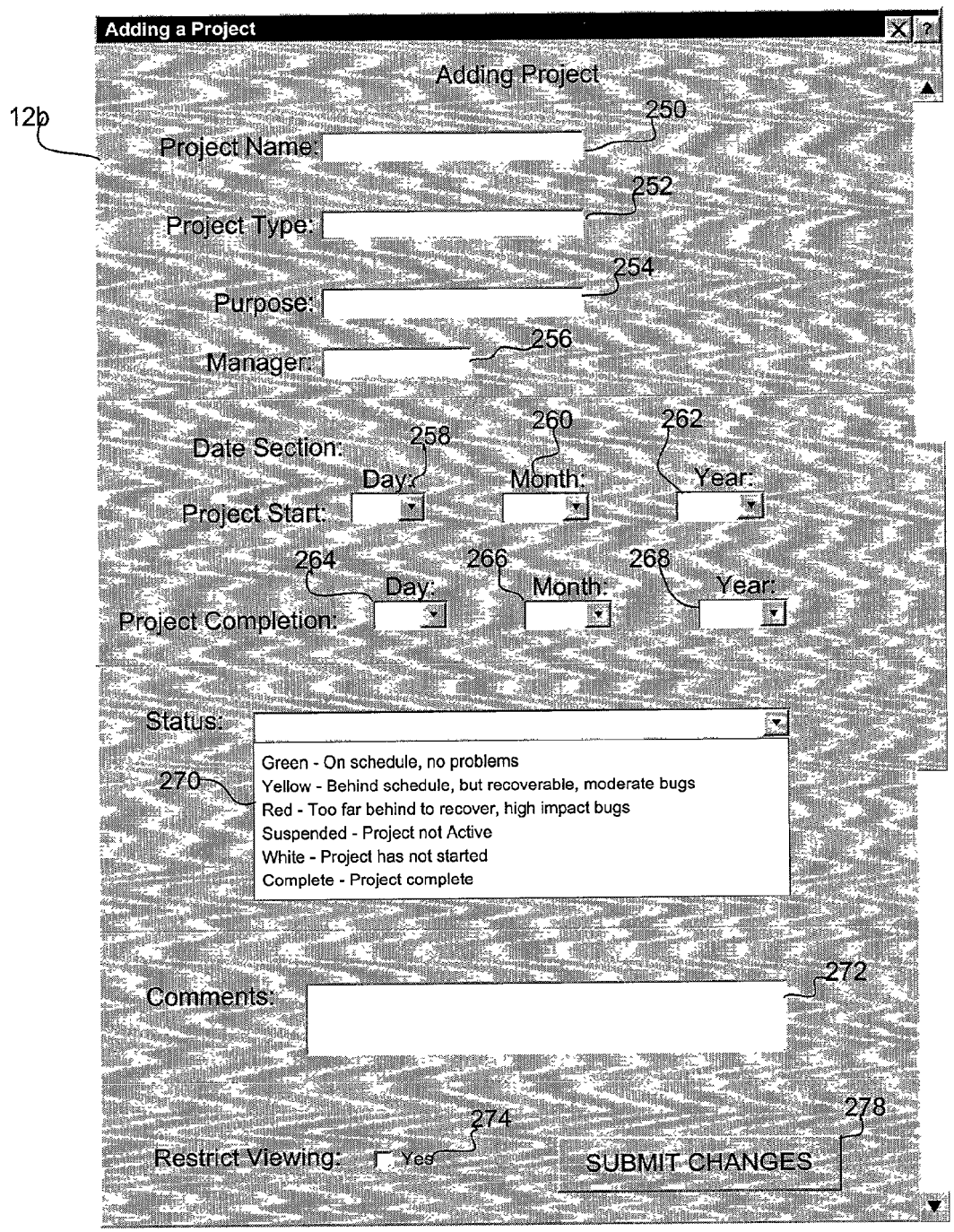
FIG. 5 illustrates a GUI panel in which the user enters project data into the file management architecture of FIGS. 3a, b in accordance with certain implementations of the invention.

FIG. 5 illustrates a blank add project page 12*b* the information server 8 would transmit to the client 2*a*, *b* . . . *n* in response to selection of the "Add a Project" link 200. This page 12*b* includes fields in which the user enters attribute value data for the project. Each entry field in the page 12*b* (FIG. 5) corresponds to one of the attribute files (FIG. 3*a*) as follows: project name entry field 250 corresponds to .projname 114*a* file; project type entry field 252 corresponds to .projtype file 116*a*; purpose entry field 254 corresponds to the purpose file 118*a*; the manager entry field 256 corresponds to the .mgr file 106*a*; the project start entry fields 258, 260, and 262 corresponds to fields 122*a*, 124*a*, 126*a*; project completion entry fields 264, 266, and 268 corresponds to 134*a*, 136*a*, and 138*a* files; the status entry field 270 corresponds to the status file 128*a*; the comments entry field 272 corresponds to the comments 104*a*; the restrict viewing check box 274 corresponds to the restrict file 120*a*, etc.

The user at the client 2*a*, *b* . . . *n* would select the submit changes button 278 displayed on the page 12*b* in their viewer program 14*a*, *b* . . . *n* to transmit the page 12*b* including data entered in one or more of the entry fields 250–274. In response to receiving the page, the information server 8 would then create a new subdirectory $100_{n+1}$ for the new project. For each entry field in which data is entered, the information server 8 would create the file corresponding to such data entry field and then implement the attribute value entered in the entry field 250–274 in the created files $104_{n+1} \ldots 144_{n+1}$, where the added project comprises the (n+1)th project for which information is maintained in the projects directory 102. The information server 8 would further generate a calendar subdirectory for the new project subdirectory and add a day file for the day the project was created. Moreover, a details subdirectory for the new project subdirectoy would also be added. In this way, all the subdirectories and accompanying files are created for the project subdirectory being created. Additionally, there can be additional fields in the add project page 12b for additional attributes and information which may be maintained in additional files in the project subdirectory.

Selection of the "Projects Interrupts/Delays" hypertext link 202 in the home page 12a (FIG. 4) would display all interrupts/delays and a link to a page (not shown) through which the user can enter information on an interrupt to a project. The entry fields on the add interrupt entry page would allow for entry of data in fields for the following interrupt attributes.

Type of Delay: one of a set of predefined types of delays, such as development delay (waiting on baselines, delays caused by an external group, etc.), management hold (number of days management put project on hold), setup (number of days required to setup lab equipment, including setup time after an interruption/delay), holidays, vacation, etc.

Date: the date the interruption began.

Duration: the duration in days of the interruption.

Comments: brief user comments providing further information on the contents.

In certain implementations, all the above information would be maintained in the interrupts file $144a, b \ldots n$ for each interrupt to the project associated with the subdirectory $100a, b \ldots n$ including the interrupts file $144a, b \ldots n$. The interrupt file $144a, b \ldots n$ would include, for each interrupt, each of the above attributes (type of delay, date, duration, and comments). In this way, the attribute file interrupts $144a, b \ldots n$ has an attribute that has multiple components and would include multiple instances of the components, one instance for each defined interrupt. The multiple components of the interrupt include the interrupt attributes, such as type of delay, date, duration, etc. Thus, certain of the attribute files may include only one value, e.g., the start month, or may include multiple instances, such as multiple interrupts. Further, each attribute value instance in the attribute file may itself be comprised of multiple components or sub-attribute values.

Figure 7:
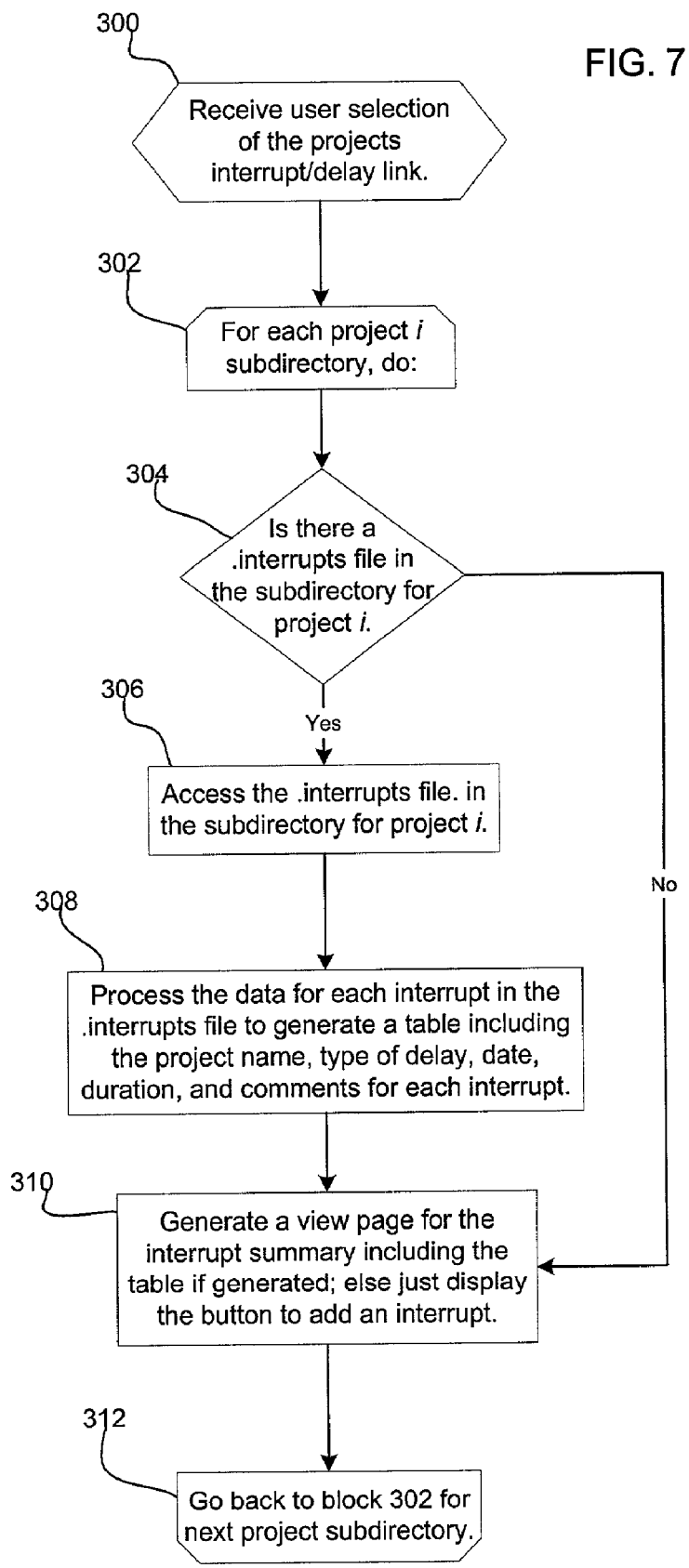
FIG. 7 illustrates logic to generate interrupt information in the file management architecture of FIGS. 3a, b in accordance with certain implementations of the invention.

FIG. 6 illustrates an example of the view page 12d that the information server 8 would generate to include information on interrupts. The page 12d may also allow the user to sort interrupts by date, project, type of delay, etc., and sum up interrupt days by month, year, and total. FIG. 7 illustrates logic implemented in the information server 8 to generate the view page 12d shown in FIG. 6. Control begins at block 300 where information sever 8 receives user selection of the projects interrupts/delays link 202 (FIG. 4). A loop is then performed at blocks 302 through 312 for each project subdirectory $100a, b \ldots n$ in the projects directory 102 (FIGS. 3a, b). If (at block 304) there is an interrupts file $144a, b \ldots n$ in the subdirectory i, then the information server 8 accesses (at block 306) the interrupts file $144a, b \ldots n$. The information server 8 then generates (at block 308) a table including a row for each project for which interrupt information is provided in the accessed interrupts file $144a, b \ldots n$, including the information on the project name, type of delay, date, duration days, and comments. In this way, the summary view 12d of FIG. 6 may have multiple rows of interrupts for a project if the project has experienced multiple interrupts, with monthly subtotals and complete totals.

The information server 8 then accesses the interrupt summary page template and generates a page 12d including, but not limited to, the generated table 332. FIG. 6 illustrates the generated page 300 for the interrupt selection including the table 332 and an add new interrupt button 334 which would return page 12c (not shown) including entry fields for the user to enter interrupt information. The add new interrupt 334 may be displayed on other view pages. The user would enter the interrupt information through their view program GUI $14a, b \ldots n$ and then submit the page to the information server 8 to add a new project interrupt delay to an interrupt file for the project, or create a new .interrupt file for the project if one does not exist.

Figure 8A:
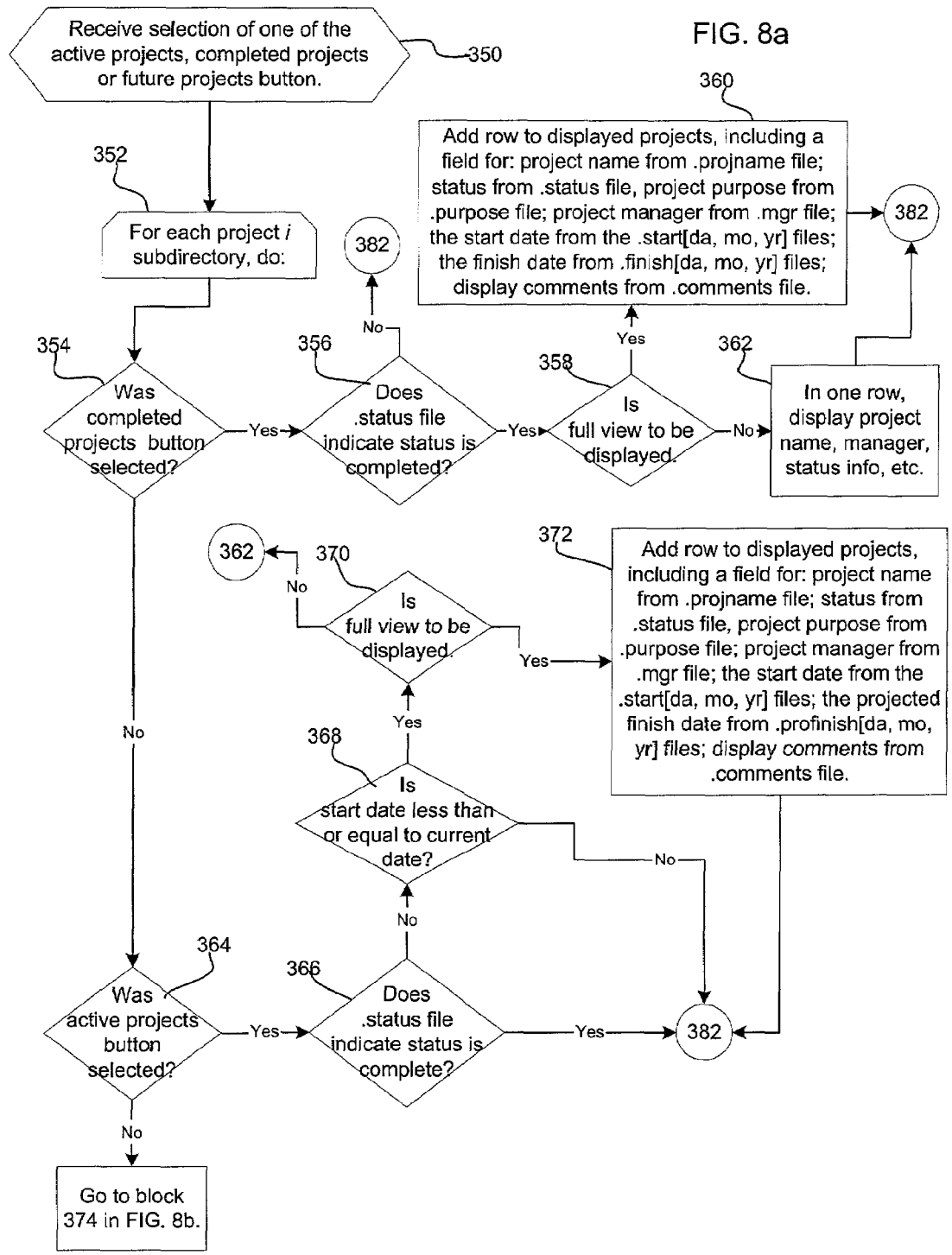
FIGS. 8a and 8b illustrate logic to display information on projects in the file management architecture of FIGS. 3a, b in accordance with certain implementations of the invention.
Figure 8B:
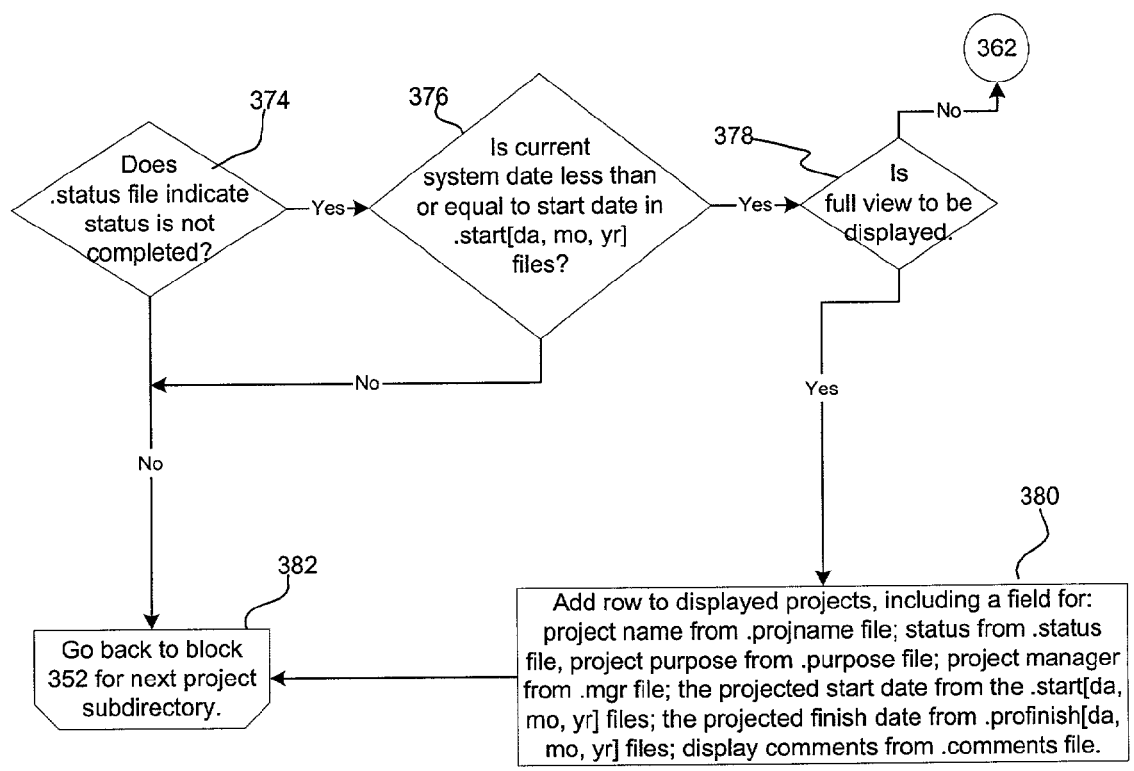

FIGS. 8a, b illustrate logic implemented in the information server 8 program to generate pages to return to the user in response to selection of the active projects link 204, the completed projects link 206, or the future projects link 208 in FIG. 4. FIG. 9 illustrates an example of a page displaying information on projects in response to selection of one of the links 204, 206, or 208. With respect to FIGS. 8a, b, control begins at block 350 upon user selection of one of the links 204, 206, or 208. For each project i subdirectory, a loop is performed at blocks 352 through 382 in FIG. 8b. If (at block 354) the completed projects link 206 was selected and the status file $128a, b \ldots n$ in subdirectory i indicates (at block 356) that the status is completed, then a determination is made (at block 358) as to whether the full view is selected to be displayed. The user may configure on a separate page the display attributes, such as whether full or partial information is displayed. If the full view is to be displayed, then the information server 8 adds (at block 360) a line to the displayed projects section of the displayed projects view page, and adds the one or more of the following attribute values from the attribute files in the subdirectory for project i to the added line in the displayed projects section: the project name from .projname file; status from status file, project purpose from purpose file; project manager from .mgr file; the start date from the .start[da, mo, yr] files; the finish date from .finish[da, mo, yr] files; and comments from comments file.

If (at block 358) the full view option is not selected, then a single row of data is displayed, instead of multiple rows, including such information as the project name from the .projname file 114a, the manager name, start data, projected completion, percent completed, and status form other of the attribute files.

If (at block 364) the active projects link 204 (FIG. 4) is selected, then a determination is made if the project is complete. This determination is made by checking the status file. If (at block 366) the status is not complete and if (at block 368) the start date indicated in the start date files in the .start[da, mo, yr] attributes files $122a \ldots n$, $124a \ldots n$, $126a \ldots n$ is less than or equal to the current date, then the project is active. If the project is active, then if (at block 370) the full view option is selected, then the information server 8 adds a row to display information on the active project. The information gathered from the attribute files $104a \ldots n$ to $144a \ldots n$ and displayed would be the same described with respect to block 360, except that the actual start date from the .startda, .startmo, and .startyr $122a \ldots n$, $124a \ldots n$, and $126a \ldots n$ would be displayed, not a projected start date, and the projected completion date from the files .profmish[da, mo, yr] $108a \ldots n$, $110a \ldots n$, and 112a . . . n would be displayed instead of the actual finish date. If the project is not active, from the no branches of blocks 366 or 368, then control proceeds to block 382 to consider the next project.

If (from the no branch of block 364) the future projects link 208 (FIG. 4) was selected, then a determination is made as to whether the project is defined to start in the future. With respect to FIG. 8b, this determination is made by checking the status file. If (at block 374) the status is not completed and if (at block 376) the start date is later than the current date, then the project will begin in the future. In such case, if the full view option is selected (at block 378), then the information server 8 generates into the page information from the attribute files 104a . . . n to 144a . . . n and the displayed data would be the same described with respect to block 360, except that the projected start date from the .startda, .startmo, and startyr 122a . . . n, 124a . . . n, and 126a . . . n would be displayed, not the actual start date, and the projected completion date from the files .profinish[da, mo, yr] 108a . . . n, 110a . . . n, and 112a . . . n would be displayed instead of the actual finish date.

FIG. 9 illustrates an example of the project display view 12e generated by the information server for completed projects. The table 388 includes the list of all the completed projects generated using the logic of FIGS. 8a, b. This view page 12e may be generated in response to user selection fo the completed projects link 206 (FIG. 4) Selection of the edit hypertext link 384 would cause the information server 8 to return a view page 12a, b . . . n including the attribute values pre-filled in the entry fields to enable the user to edit the attribute values for the project. The information gathered from the different attribute files for each completed project is displayed in the table 388. Selection of a details link 386 would display a details page 12f in which the user may enter information on tasks, interrupts, bugs or phases for a project.

Figure 3B:
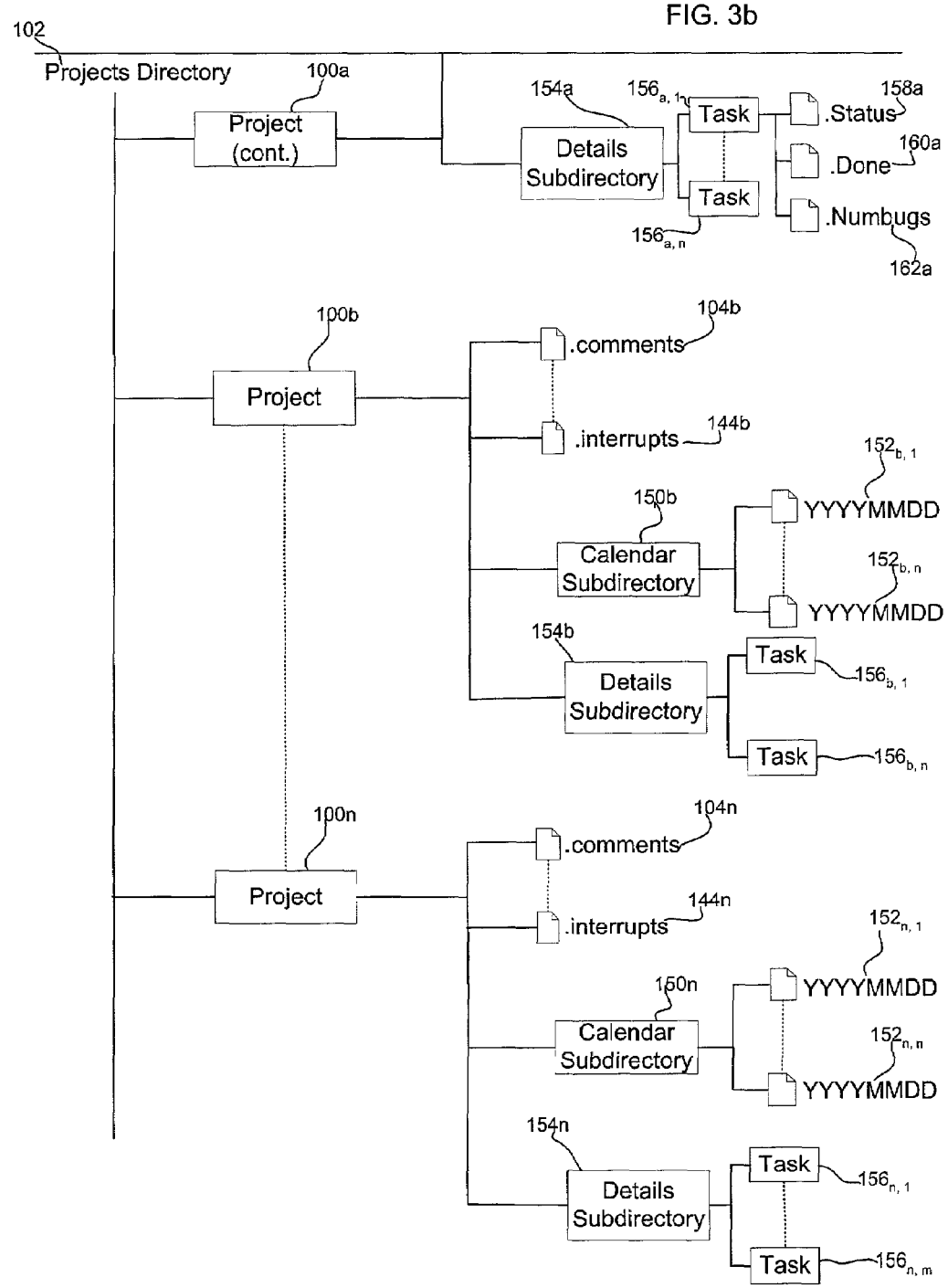

FIG. 10 illustrates an example of the details view 12f of a task project status displayed for an active project in response to the selection of a details link, such as the details link 386 in the projects table 12e. The task area column 400 displays the name of tasks defined for a project. As discussed, each separate task would comprise a subdirectory $156_{a, 1}$ . . . $156_{a, n}$ (FIG. 3b) of the details subdirectory 154a of the project 100a, b . . . n for which the task is defined. The task on time column 402 indicates the current status of the task, which may be stored in the Status file 158a in the task subdirectory (FIG. 3b). The percentage of task completion shown in the third column 404 may also be stored in a separate file (160a) within the task subdirectories 156a, 1 . . . 156a, n as well as the .numbugs file 162a, which displays the number of bugs filed for a task in column 406. Additional columns of information may be provided in a task view for which there would be one or more files under the task subdirectory $156a, 1 . . . 156_{a, n}$.

Figure 11:
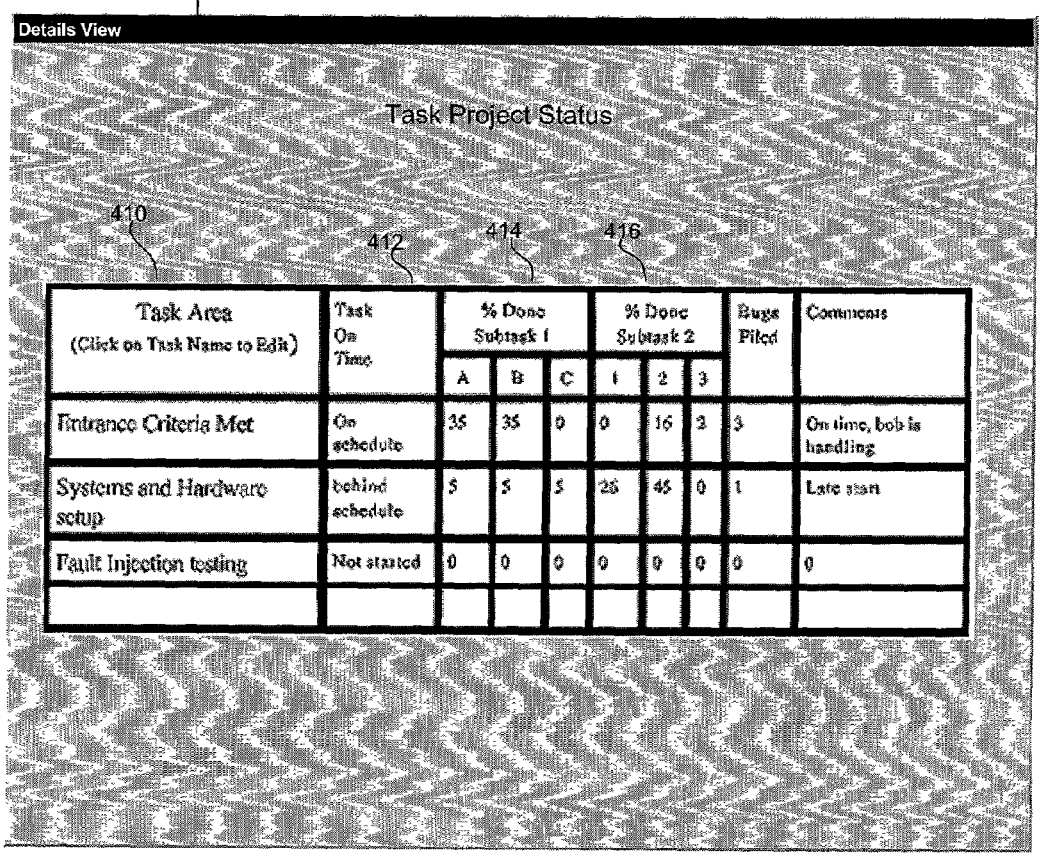
FIG. 11 illustrates a GUI panel displaying subtask information generated in accordance with certain implementations of the invention.

In still further implementations, each task may be comprised of subtasks having a separate percentage complete for each subtask. FIG. 11 illustrates an implementation of a projects table 12g where two of the tasks within the projects were defined to include subtasks. Each defined subtask 414 and 416 includes further subsections, shown as A, B, and C for subtask 414 and 1, 2, and 3 for subtask 416, in which the user may enter different percentage down amounts indicating the percentage completed of the different sections of a subtask. The data for each subtask could be stored in a separate directory of the task subdirectory $156_{a, 1}$ . . . $156_{a, n}$, (FIG. 3b) where each subtask subdirectory would further include files for the attributes for a subtask, such as the percentage completed of different sections of the subtask.

Figure 12:
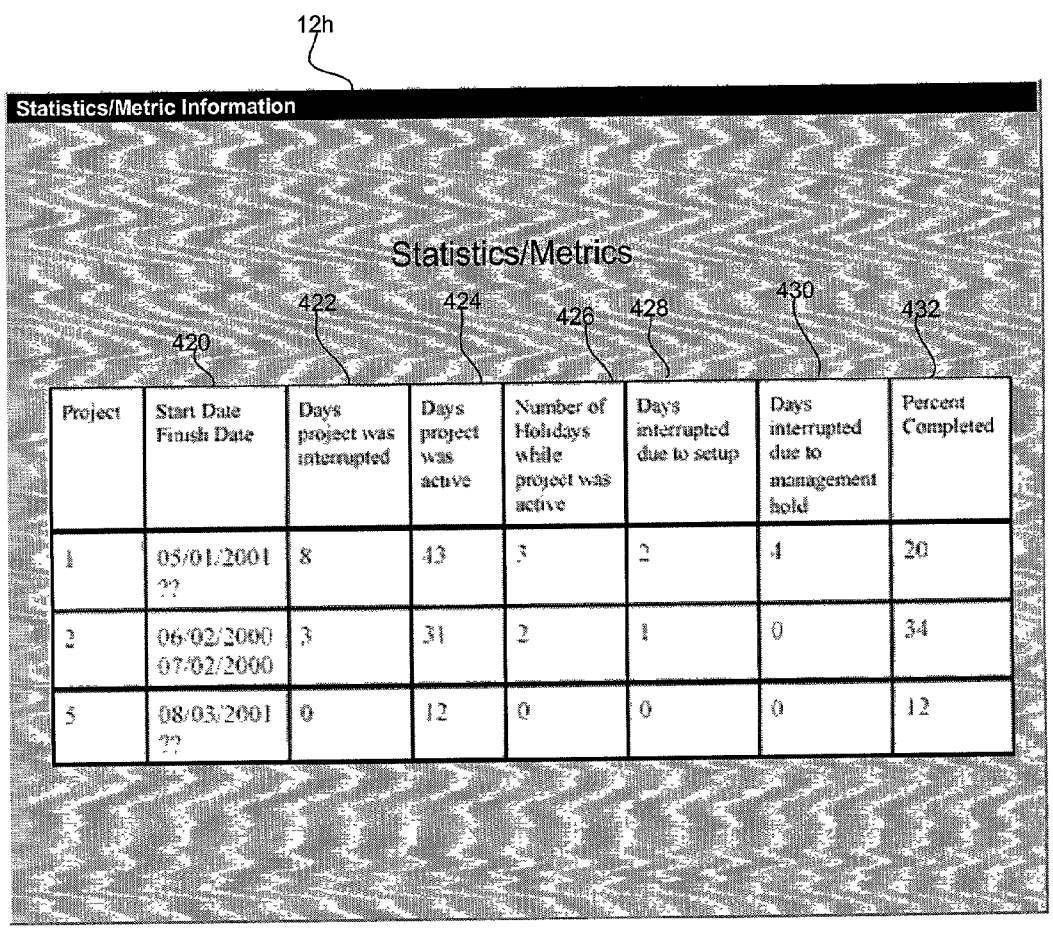
FIG. 12 illustrates a GUI panel displaying statistical information on the data in the file management architecture of FIGS. 3a, b in accordance with certain implementations of the invention.

In further implementations, in response to the user selecting the statistic/metric link 210 (FIG. 4), the information server 8 would search certain of the attribute files 104a . . . n to 144a . . . n and the done file 160a for each project to gather metric and statistical data on certain attribute values on a project-by-project basis. The information may the be displayed in a metric view 12h shown in FIG. 12. For instance, information on the start and finish date displayed in column 420 may be obtained from the start 122a, 124a, 126a and the finish 134a, 136a, and 138a attribute files and information on the number of days a project was interrupted 422 and the type of interrupt 426, 428, 430 (holidays, days interrupted due to setup, and days interrupted due to management) would be obtained from the interrupts file 144a . . . n for each project. Further displayed is a percent completed 432 of the project which may be obtained from the .done 160a file. Information on the number of holidays could be obtain from the holidays files 142a . . . n. Other displayed statistical information may be derived from data in the attribute files. For instance, the number of days an active project has been active, shown in column 424 of FIG. 12, may be determined by subtracting the start date from the current date, and then subtracting any holidays, interrupt days, and weekends. Such information on the status can be obtained from the status attribute file 128a . . . n and the start related and finish related attribute files. The information displayed in the view 12h may further summarize information on a per task basis if multiple tasks are defined for a project. Such a breakdown would require further subcolumns in each type of delay 426, 428, 430 to provide the information for each task defined for a project.

As discussed, there may be additional subclasses of an information class. For instance, the calendar subclass of a project class provides a calendar view of a project. The calendar subdirectory 150a . . . n (FIGS. 3a, b) that stores the data for the project calendar includes one attribute file 152a, 1 . . . $152_{a, n}$ for each day for which there is information to present. Each day attribute file for a calendar subdirectory includes information for a day. In certain implementations, whenever a user submits a page including a new interrupt added in the interrupts file 144a . . . n or a new bug added to the .bugtraqs file, then the information server 8 will append the information to the day file $152_{a, 1}$ . . . 152a, n for the day and affected project.

FIG. 13 illustrates an example of a project calendar view 12i, where each day entry is either empty or includes the information added to the attribute file for that day in response to information being added to one of the project attribute files tracked by the calendar. For instance, if changes to the interrupts file 144a . . . n are made concerning a new interrupt, then such changes would be reflected in the day file $152_{a, 1}$ . . . $152_{a, n}$ for the particular day on which the interrupt occurred. In response to a tracked attribute file being modified, the information server 8 would apply the updates to the tracked file to the calendar file for the effected day. Other files that may be tracked by the calendar include the .bugtraq file etc. Additionally, the user may directly enter information into the project calendar 440 by selecting a day and adding the information. In response, the information server 8 would add the user entered information into the day file $152_{a, 1}$ . . . 152a, n for the user selected day and project. If there is no day file $152_{a, 1}$ . . . $152_{a, n}$ for the affected day, then the information server may create a new day file for the added information.

The described implementations concerned a file architecture for storing information used by an application program. In the file architecture, the application data is stored in separate files, and then accessed to allow a user to enter information or view the application data dispersed throughout different files.

The described file architecture may be implemented using standard file data structures and file management commands supplied by the operating system. The information server 8 would make file management command calls to access the data dispersed through the files in the file architecture.

The described implementations can implement a robust information management program without requiring the use of a database application program because the database and data management is implemented in the file system directories. This aspect makes the described architecture highly portable to other systems because applications written for different operating systems may include the same logic, but just use the calls for the target operating system. Because the basic file management operations are very similar for different operating systems, creating different versions of the information manager program for different operating systems would only require modifying the file management calls, which are often very similar in operation.

Additionally, the described implementations communicate with the users using an open document format compatible with the viewer programs users are likely to already have installed on their client systems 2a, b . . . n, e.g., web browsers. In such implementations, the users do not need to install any additional client programs on their machine because their viewer program is all that is needed. Implementing the system in this manner avoids the need to install special purpose database and interface software on both the clients and server because the described implementations exploit already existing installed viewer and network communication programs.

Providing a Locking Mechanism For Editable Data in the Viewable Pages

As discussed, a viewer program 14a, b . . . n may render a page of data where the data in the page is derived from different files in the data directories 10. Further, the user may modify particular data and submit the page with the modified data to update the files corresponding to the modified data. In a multiuser environment, the information server 8 may provide a locking mechanism to prevent multiple viewers 14a, b . . . n from simultaneously modifying the same files/data.

Figure 14:
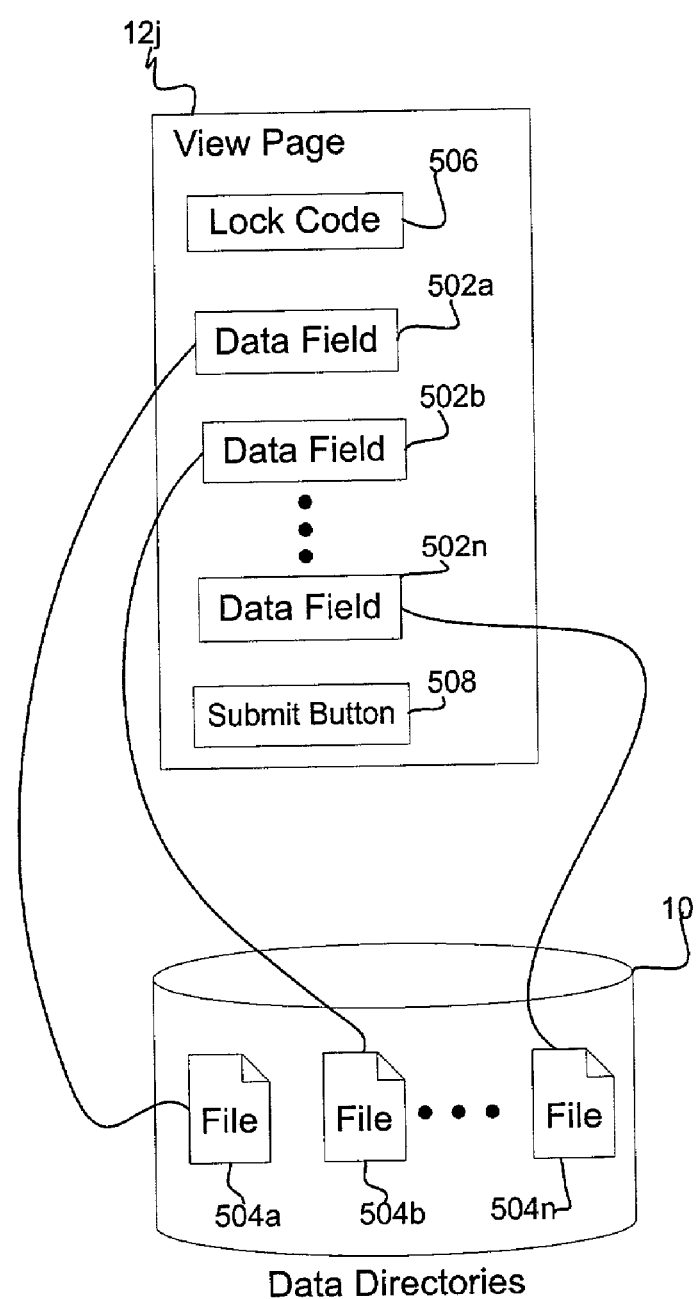
FIG. 14 illustrates a relationship of a view page and files in accordance with certain implementations of the invention.

In certain implementations, the information server 8 encodes each view page 12a, b . . . n (FIG. 1) that may be used to receiver user modifications to files in the data directories 10 with a lock code. FIG. 14 illustrates a view page 12j, such as one of the view pages 12a, b . . . n in the server 4, including a plurality of editable fields 502a, b . . . n that include data stored in files 504a, b . . . n in the data directories 10 (FIG. 1). The files 504a, b . . . n may be in the same or different subdirectories of a common information class subdirectory 52a, b . . . n (FIG. 2). For instance, with reference to FIG. 14, the data in the editable fields 502a, b . . . n may be stored in attribute files 54a, b . . . n within the main information class subdirectory 52a, b . . . n or within one of the attribute files 58a, b . . . n within one subclass subdirectory 56a, b . . . n (FIG. 2). One or more of the editable fields 502a, b . . . n displayed in the view page 12j may be modified by a user using the viewer program 14a, b . . . n and input devices at the clients 2a, b . . . n (FIG. 1). The view page 12j further includes a submit button 508 which causes the viewer 14a, b . . . n to transmit the view page 12j with modified data in one or more of the editable fields 502a, b . . . n to the information server 8 to update the files 504a, b . . . n with the user entered modified data.

The view page 12i further includes a lock code 506 generated from the files 504a, b . . . n that provide the data to the editable fields 502a, b . . . n. In certain implementations, a checksum operation is performed, such as the Unix "/usr/ucb/sum" operation that generates a 16 bit checksum for a file. The information server 8 may calculate a single lock code value 506 based on the checksum of all the data files 504a, b . . . n. In certain implementations, this lock code 506 is then embedded as a hidden code in the view page 12j, and not displayed or rendered by the viewer 14a, b . . . n. When the viewer 14a, b . . . n transmits the view page 12j back to the information server 8 with modified data in the editable fields 502a, b . . . n, the information server 8 would then determine, in the manner described below, whether the data files 504a, b . . . n have changed since the view page 12j was generated by the information server 8 to prevent changes to files that have received an intervening modification.

Figure 15:
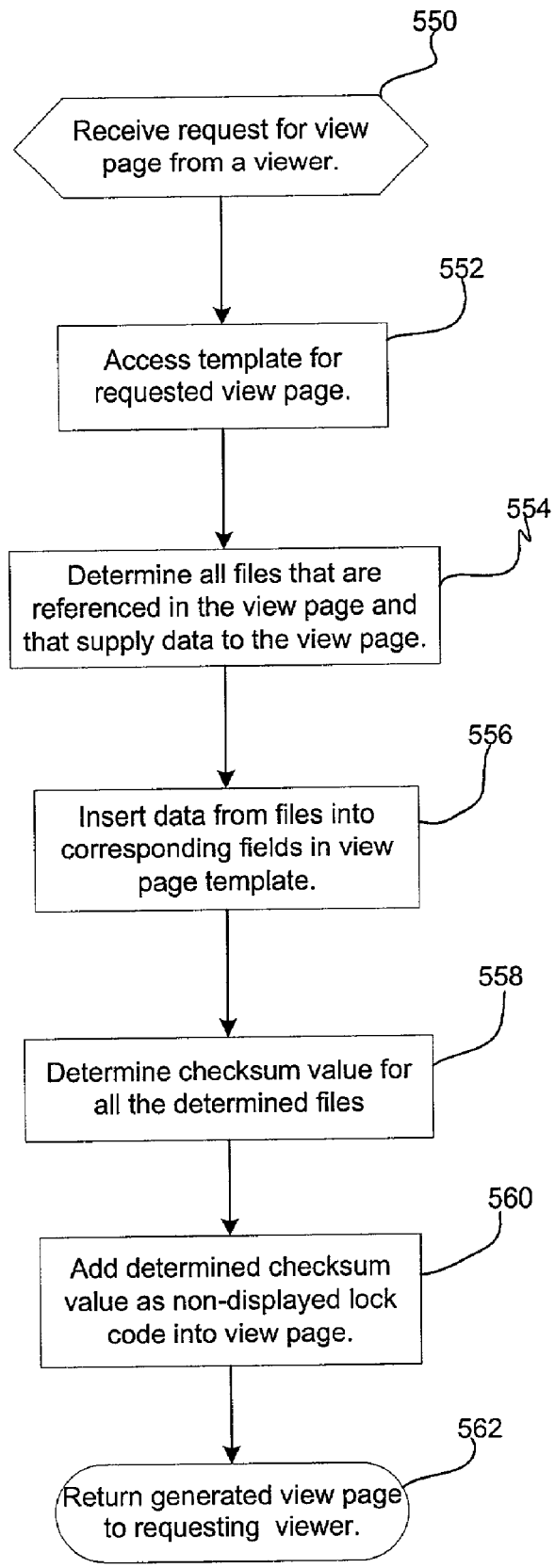
FIG. 15 illustrates logic to generate a view page, such as the page shown in FIG. 12, including editable fields in accordance with certain implementations of the invention.

FIG. 15 illustrates logic implemented in the information server 8 to encode a view page 12j to return to a viewer 14a, b . . . n (FIG. 1) with the lock code 506. Control begins at block 550 with the information server 8 receiving a request from the viewer 14a for a view page 12j (FIG. 14) that has editable fields 502a, b . . . n in which the user of the viewer 14a, b . . . n may modify data. In response, the information server 8 accesses (at block 552) the view page 12j template and determines (at block 554) all files 504a, b . . . n that correspond to editable fields 502a, b . . . n in the view page 12j. The data from the files 504a, b . . . n, e.g., the project name, project type, status, etc., is then inserted (at block 556) into the editable fields 502a, b . . . n. A checksum value is then determined (at block 558) from all of the files 504a, b . . . n that can be used to validate and determine whether subsequent changes have been made to any of the files 504a, b . . . n. As discussed, the Unix sum command may be used. Alternatively, any other type of operation or algorithm may be used to generate a unique value based on the current state of the files, including other types of checksum operations or non-checksum operations that can determine a unique value for a group of files 504a, b . . . n (FIG. 14) and be used to determine whether any subsequent changes have been made to the files. The information server 8 then inserts (at block 560) the calculated checksum value as the lock code 506 into the view page 12j. As discussed, the lock code 506 may be encoded within the page 12j as a hidden field and not displayed by the viewer program 14a, b . . . n to the user. For instance, in implementations where the view page 12j is an HTML page, the lock code 506 may be added as a hidden field to the view page 12j. This lock code 506 would also be included in any page the viewer 14a, b . . . n returns to the information server 8 when the user selects the submit button 508. The generated view page 12j is then returned (at bock 562) to the viewer program 14a, b . . . n that initiated the page request.

As discussed, upon receiving the view page 12j, the user of the viewer 14a, b . . . n may then modify one or more of the editable fields 502a, b . . . n in the view page 12j. The view page 12j may include editable as well as read-only data fields generated from the files 504a, b . . . n in the data directories 10. After the user has modified one or more of the editable fields 502a, b . . . n in the view page 12j displayed by the viewer 14a, b . . . n, the user may select the submit button 508 to transmit the view page 12j including fields 502a, b . . . n having modified data to the information server 8.

Figure 16:
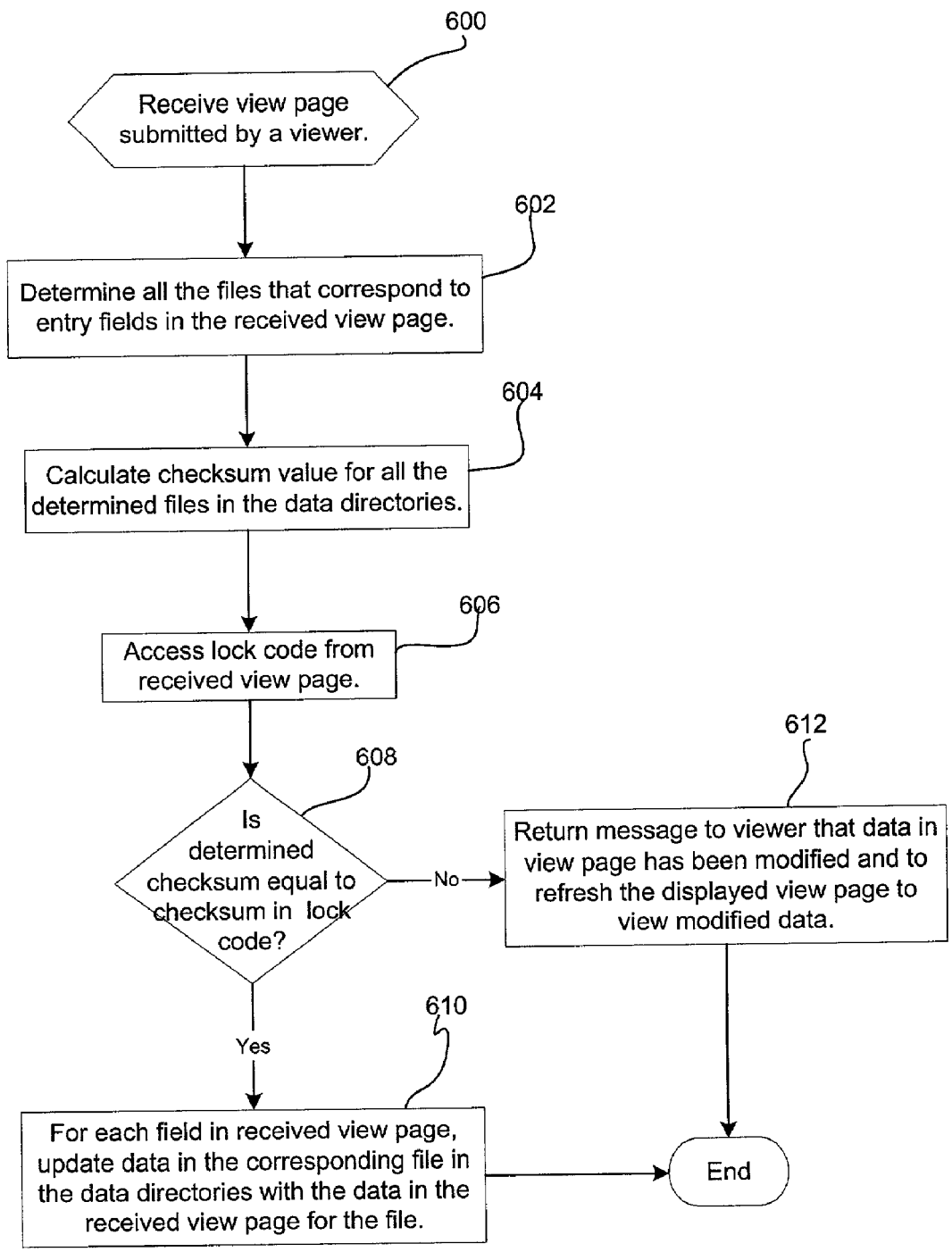
FIG. 16 illustrates logic to update files with modified data in the editable fields of a returned view page, such as the page shown in FIG. 14, in accordance with certain implementations of the invention.

FIG. 16 illustrates logic implemented in the information server 8 to process a view page 12*j* returned by one of the viewers 14*a*, *b* . . . *n*. In response to receiving a returned view page 12*j* with modified data entered into one or more of the editable fields 502*a*, *b* . . . *n* at block 600, the information server 8 determines (at block 602) all the files 504*a*, *b* . . . *n* that correspond to the editable fields 502*a*, *b* . . . *n* in the returned view page 12*j*. The information server 8 then applies (at block 604) the same checksum operation, or other type of validation operation, applied at block 558 in FIG. 15, to the determined files 504*a*, *b* . . . *n* and accesses (at block 606) the lock code 506 from the returned view page 12*j*, which comprises the checksum calculated when the view page 12*j* was generated. If (at block 608) the checksum calculated at block 604 matches the lock code 506 accessed from the returned view page 12*j*, then no change has been made to any of the files 504*a*, *b* . . . *n* since the view page 12*j* was initially generated using the logic of FIG. 16. In such case, because there has been no intervening changes, the information server 8 updates (at block 610) every file 504*a*, *b* . . . *n* with the data in the editable fields 502*a*, *b* . . . *n* so that any modifications entered by the user are applied to the files 504*a*, *b* . . . *n* in the data directories 10. If (at block 608) the checksum calculated at block 604 does not match the lock code 506, then one of the files 504*a*, *b* . . . *n* has been modified by another user while the view page 12*j* was pending at the viewer 14*a*, *b* . . . *n*. In such case of an intervening modification, the information server 8 returns (at block 612) a message to the viewer 14*a*, *b* . . . *n* that transmitted the view page 12*j* that an intervening change has occurred. The message may also instruct the user to refresh the view page 12*j* and resubmit the modifications.

Figure 17:
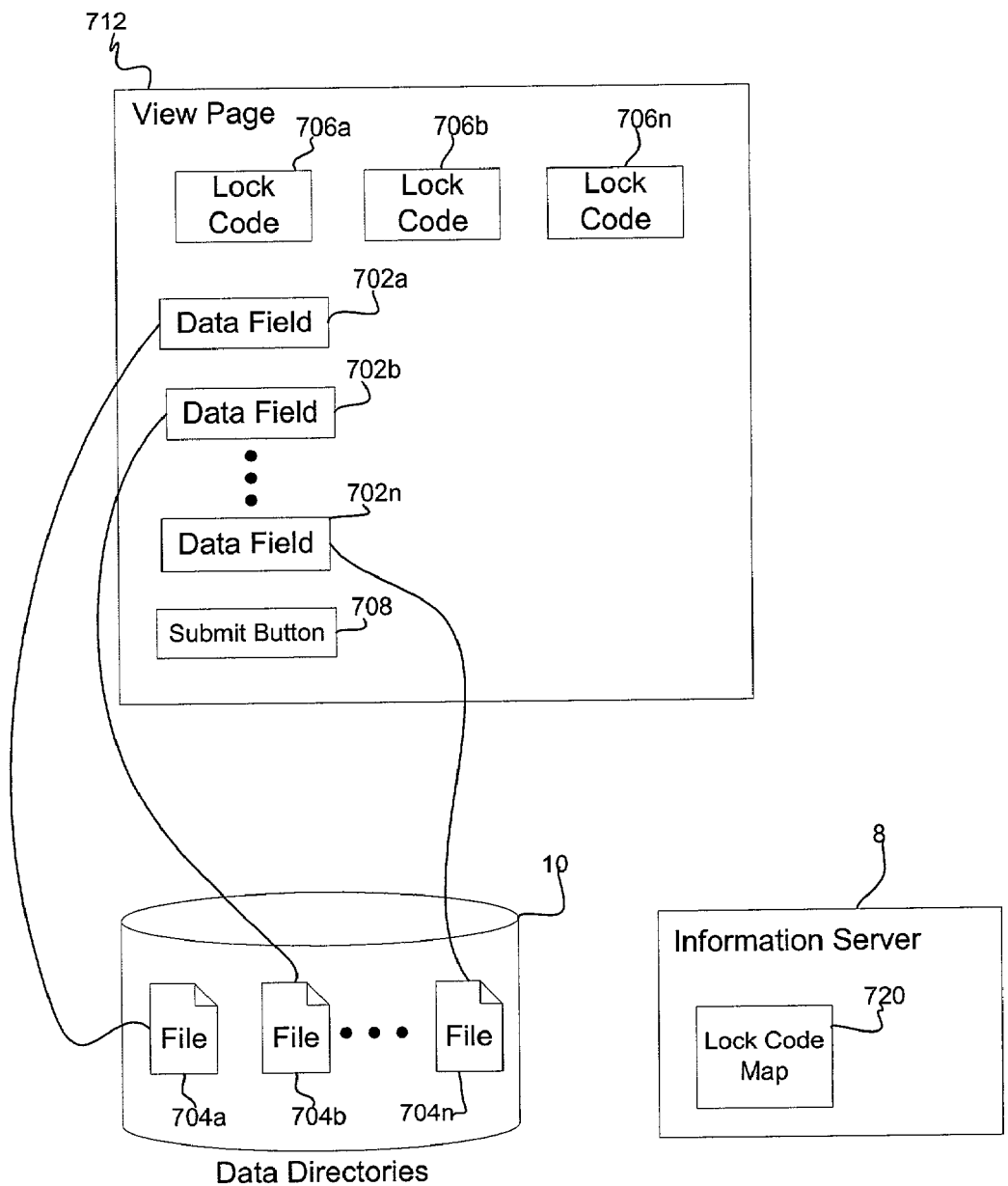
FIG. 17 illustrates a relationship of a view page and files in accordance with certain implementations of the invention.

In the described logic of FIGS. 15 and 16 the lock code 506 is applied to all of the editable fields 502*a*, *b* . . . *n* and corresponding files 504*a*, *b* . . . *n* that are presented in the view page 12*j*. Additionally, the view page 12*j* may include multiple lock codes for different groups of one or more editable fields 502*a*, *b* . . . *n*, thus separately monitoring changes to different editable fields 502*a*, *b* . . . *n* and the corresponding files 504*a*, *b* . . . *n* in a single page 12*j*. One lock code may be used to manage access to only one editable field and corresponding file 704*a*, *b* . . . *n*, thereby allowing concurrent updates to different editable fields or one lock code may be used to manage access to multiple editable fields 702*a*, *b* . . . *n* and corresponding files 704*a*, *b* . . . *n*, that is less than all of the editable fields. FIG. 17 illustrates an implementation where the information server 8 has encoded the view page 712 with multiple lock codes 706*a*, *b* . . . *n*, wherein each lock code 706*a*, *b* . . . *n* is associated with one or more files 704*a*, *b* . . . *n* referenced in the page 12*j*, such that one file 704*a*, *b* . . . *n* is associated with only one lock code 706*a*, *b* . . . *n*. However, multiple files may be associated with a same lock code. The information server 8 includes a lock code map 720 (FIG. 17) indicating groups of one or more files 704*a*, *b* . . . *n* that are assigned to the same lock code. In one implementation, the information server 8 may use unique lock code names, indicated in the lock code map 720, to uniquely identify each lock code maintained in the view page 712.

When generating the view page 712 having multiple lock codes in a page, the information server 8 would look at the lock code map 720 to determine the files 704*a*, *b* . . . *n* referenced in the view page 712 editable fields 702*a*, *b* . . . *n* associated with lock codes 706*a*, *b* . . . *n*. The checksum operation at block 604 in FIG. 16 would then be performed for each lock code represented in the view page by performing the checksum operation separately on each group of one or more files 704*a*, *b* . . . *n* corresponding to editable fields 702*a*, *b* . . . *n* in the page 712.

Figure 18:
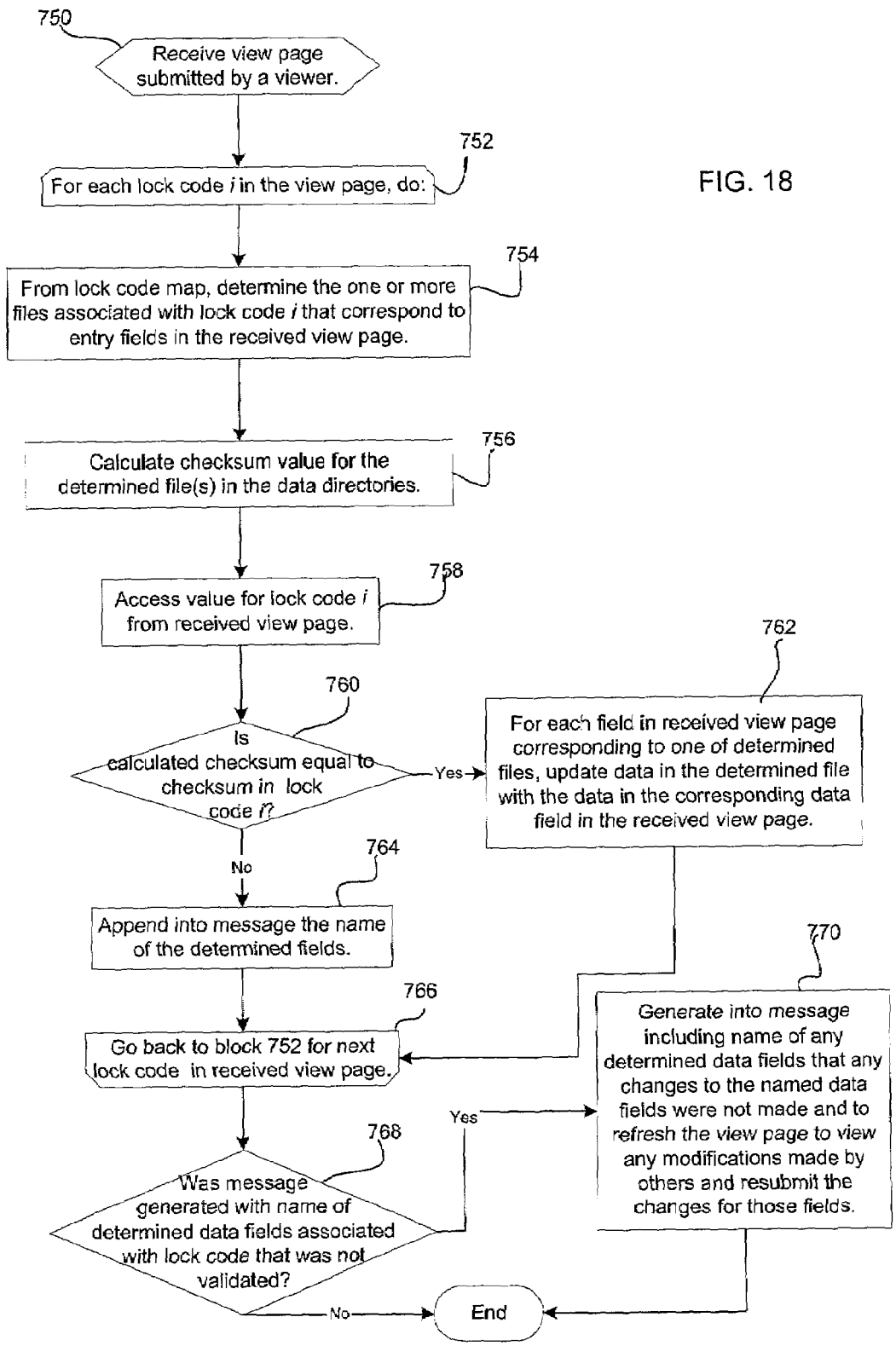
FIG. 18 illustrates logic to update files with modified data in a returned view page, such as the page shown in FIG. 17, in accordance with certain implementations of the invention.

FIG. 18 illustrates logic implemented in the information server 8 to determine whether to apply modified data from a view page 712 transmitted from a viewer 14*a*, *b* . . . *n* when the view page includes multiple lock codes 706*a*, *b* . . . *n*. Upon receiving (at block 750) a view page 712 (FIG. 17) from one of the viewers 14*a*, *b* . . . *n*, a loop is performed at blocks 752 through 766 for each lock code 706*a*, *b* . . . *n* in the view page 712. The information server 8 processes (at block 754) the lock code map 720 to determine the files 704*a*, *b* . . . *n* associated with lock code i that correspond to editable fields 702*a*, *b* . . . *n* in the view page 712, i.e., the association of data entry fields/files referenced in the view page 712 to lock code i. The checksum value for the determined files 704*a*, *b* . . . *n* in the data directories 10 is calculated (at block 756) and the lock code i value is accessed (at block 758) from the received view page 712. If (at block 760) the checksum calculated at block 756 is the same as the accessed lock code i, then the files 704*a*, *b* . . . *n* associated with lock code i in the lock code map 720 have not been modified by another user since the view page 712 was initially generated. In such case, the information server 8 updates data in the determined files 704*a*, *b* . . . *n* associated with lock code i with the data in the corresponding editable fields 702*a*, *b* . . . *n* in the received view page 712. Otherwise, if the calculated checksum is not equal to lock code i, then an intervening user has modified one of the determined files 704*a*, *b* . . . *n* associated with lock code i since the view page 712 was initially generated. In such case, the information server 8 appends into a return message the names of the determined editable fields 702*a*, *b* . . . *n* corresponding to the files 704*a*, *b* . . . *n* associated with the lock code i.

From blocks 762 or 764 control proceeds (at block 766) back to block 752 to consider the next lock code 706*a*, *b* . . . *n* in the received view page 712 until all lock codes in the view page 712 are considered. After considering all lock codes 706*a*, *b* . . . *n* in the view page 712, a determination is made as to whether (at block 768) a message was generated including the name of editable fields 702*a*, *b* . . . *n* corresponding to files 704*a*, *b* . . . *n* associated with lock codes that were not validated, i.e., lock codes that did not match the recalculated checksum for the files 704*a*, *b* . . . *n* associated with the lock code 706*a*, *b* . . . *n*. If such a message was generated, then the information server 8 adds content to inform the user that any changes entered for the following named data fields 702*a*, *b* . . . *n* were not made due to possible intervening modifications. The message may also inform the user to refresh the view page 712 to view any changes to the data in the editable fields 702*a*, *b* . . . *n* and resubmit any changes that could not be made on the previous submission.

The described implementations provide a locking mechanism that does not require the central information server 8 to maintain locking information. Instead, the locking information needed to determine if changes were made is encoded in the page transmitted or otherwise provided to the multiple users. With the described implementations, user modifications are not applied to files if the modified file is associated with a group of files that received intervening modifications from other users. Further, with the described implementations no one user can lockout or prevent another user from submitting changes because changes are made on a first-come, first serve basis. Users that have pages outstanding at the time the first user submits changes with respect to a group of data fields associated with a group of files would be blocked from submitting changes to the same group of data fields and files, and required to refresh the page and receive the modified data before their changes will be accepted.

Still further, in certain implementations where the locking data is maintained in the remote pages, a failure or crash of the information server 8 will not comprise a loss of the locking data. When the information server 8 again becomes operational it can still perform the validation operations described with respect to FIGS. 15 and 18 because the locking data needed to determine whether intervening changes were made is maintained in the remote pages that the users submit with their proposed modifications.

Additional Implementation Details

The described file management architecture may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the view pages 12*a, b . . . n* were implemented as HTML pages for display in a web browser type viewer. Additionally, the view pages 12*a, b . . . n* may be in alternative media formats, such as Extensible Markup Language (XML) pages, Standard Generalized Markup Language (SGML) file, ASCII, etc. The described implementations utilize a browser program, such as a web browser capable of rendering HTML and other markup language content. However, any presentation program capable of rendering content in any media format may be used to render the state changes supplied by the server.

In the described implementations, the client and server used the HTTP protocol to communicate. In alternative implementations, the client and server may use any communication or messaging protocol known in the art to communicate.

The described implementations include one class type whose files are stored in a subdirectory of the main directory and one subclass for each class type, implemented as a subdirectory of the information class subdirectory. Additional information class types may be added at the same level providing different types of information and additional attribute files may be provided to store the values associated with the additional information classes.

The preferred logic of FIGS. 7, 8*a,* 8*b,* 15, 16, 18 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

In further implementations, an intervening modification check may be made when a user enters data into one of the editable fields whether the entered data conforms to the data type of the modified editable field. If the user entered data type is inconsistent with the data type of the editable field, then an error message may be returned indicating the reason for the error. This check may be performed by the viewer program while the view page is displayed at the client or may be performed by the information server when processing the editable fields in the returned view page.

In the described implementations, the editable fields in the view page transmitted to the viewer programs referenced data in multiple files and the lock code was associated with one or more of the files providing data to the data fields in the view page. In alternative implementations all the data fields may reference data in a single file, and the lock code embedded in the view page would be used to determine whether intervening changes were made to the one file supplying the data to the fields in the view page.

In the described implementations the lock code was encoded into the page content, such as a hidden value in an HTML page. In additional implementations, the lock code may be provided in a different manner. For instance, the lock code may be appended to the Universal Resource Locator (URL) address of the page transmitted to the information server 8. Still further, the lock code may be provided in a separate data object transmitted with the page.

In the described implementations, modified data entered in the editable fields of a returned view page may be added to the content of the files corresponding to the data fields, or if the data is maintained in the file name, then the name of the corresponding file would be modified.

In the described implementations, the data in the editable fields was obtained from files in a file system. In alternative implementations, the data in the editable fields may reference data objects other than files, such as records in a database system or any other program objects known in the art that may be separately accessed and updated.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A method for managing accesses to data objects by multiple user programs over a network, comprising:
generating a page including at least one editable field of data from at least one data object;
calculating an initial value from the at least one data object, said initial value reflecting the initial state of information in said data object;

transmitting the page and the initial value to one user program over the network;

receiving the page and the initial value from the user program, wherein the received page includes modified data in at least one editable field;

calculating a current value from the at least one data object after receiving the page, said current value reflecting the current state of information in said data object;

determining whether the initial value transmitted with the received page is different than the current value; and if the initial and current values match, updating the data object with the modified data included in the received page.

2. The method of claim 1, further comprising:

not updating the data object with the modified data in the received page if the initial and current values do not match.

3. The method of claim 2, further comprising:

returning a message to the user program transmitting the page indicating that the modified data in the transmitted page was not applied to the data object.

4. The method of claim 1, wherein updating the data object comprises adding the modified data to the content of the data object.

5. The method of claim 1, wherein updating the data object comprises adding the modified data to a name of the data object.

6. The method of claim 1, wherein the page includes multiple editable fields, wherein each of the editable fields correspond to one of a plurality of data objects, wherein the value is calculated from the plurality of the data objects, whereby a modification to one of the plurality of data objects between a time the initial value and current value are calculated will cause the initial value to differ from the current value.

7. The method of claim 6, wherein updating the data object further comprises updating each of the plurality of data objects with the data from the corresponding editable field in the received page, wherein at least one of the editable fields includes modified data.

8. The method of claim 1, wherein the page includes multiple editable fields, wherein each of the editable fields corresponds to one of a plurality of data objects, wherein calculating the initial value further comprises calculating a plurality of initial values, wherein each initial value is calculated from at least one data object corresponding to at least one editable field in the page;

wherein calculating the current value further comprises calculating a plurality of current values, wherein each current value is calculated from at least one data object corresponding to at least one editable field in the page;

wherein determining whether the initial value transmitted with the received page is different than the current value is performed for each of the plurality of initial and current values; and wherein updating the data object with the modified data included in the received page further comprises updating each data object used in the calculation of the matching initial and current values with the modified data included in the received page.

9. The method of claim 8, further comprising:

generating information on groups of the data objects corresponding to editable fields in the page, wherein each group comprises at least one data object corresponding to one editable field in the page, and wherein one initial value is calculated for each group from the data objects in the group.

10. The method of claim 9, wherein each data object is associated with only one group.

11. The method of claim 8, further comprising:

generating information into a message indicating editable fields corresponding to data objects used in calculating initial and current values that do not match; and generating information into the message that modifications made to the indicated editable fields were not applied.

12. The method of claim 1, wherein the initial value and current value are calculated by performing a checksum operation on the at least one data object.

13. The method of claim 1, wherein the page comprises one of a Hypertext Markup Language page. Extensible Markup Language (XML) page, an American Standard Code for Information Interchange (ASCII) text file, and Standard Generalized Markup Language (SGML).

14. The method of claim 1, wherein each data object comprises a file in a file system.

15. The method of claim 1, wherein the user program generates a graphical user interface in which the page is rendered and presented.

16. The method of claim 1, wherein the initial value is encoded in the page.

17. A system for managing accesses to data objects by multiple user programs over a network, comprising:

means for generating a page including at least one editable field of data from at least one data object;

means for calculating an initial value from the at least one data object, said initial value reflecting the initial state of information in said data object;

means for transmitting the page and the initial value to one user program over the network;

means for receiving the page and the initial value from the user program, wherein the received page includes modified data in at least one editable field;

means for calculating a current value from the at least one data object after receiving the page, said current value reflecting the current state of information in said data object;

means for determining whether the initial value transmitted with the received page is different than the current value; and means for updating, if the initial and current values match, the data object with the modified data included in the received page.

18. The system of claim 17, wherein the data object is not updated with the modified data in the received page if the initial and current values do not match.

19. The system of claim 18, further comprising:

means for returning a message to the user program transmitting the page indicating that the modified data in the transmitted page was not applied to the data object.

20. The system of claim 17, wherein the means for updating the data object adds the modified data to the content of the data object.

21. The system of claim 17, wherein the means for updating the data object adds the modified data to a name of the data object.

22. The system of claim 17, wherein the page includes multiple editable fields, wherein each of the editable fields correspond to one of a plurality of data objects, wherein the value is calculated from the plurality of the data objects, whereby a modification to one of the plurality of data objects between a time the initial value and current value are calculated will cause the initial value to differ from the current value.

23. The system of claim 22, wherein the means for updating the data object updates each of the plurality of data objects with the data from the corresponding editable field in the received page, wherein at least one of the editable fields includes modified data.

24. The system of claim 17, wherein the page includes multiple editable fields, wherein each of the editable fields corresponds to one of a plurality of data objects,
wherein the means for calculating the initial value calculates a plurality of initial values, wherein each initial value is calculated from at least one data object corresponding to at least one editable field in the page;
wherein the means for calculating the current value further calculates a plurality of current values, wherein each current value is calculated from at least one data object corresponding to at least one editable field in the page;
wherein the means for determining whether the initial value transmitted with the received page is different than the current value performs the determination for each of the plurality of initial and current values; and
wherein the means for updating the data object with the modified data included in the received page updates each data object used in the calculation of the matching initial and current values with the modified data included in the received page.

25. The system of claim 24, further comprising:
means for generating information on groups of the data objects corresponding to editable fields in the page, wherein each group comprises at least one data object corresponding to one editable field in the page, and wherein one initial value is calculated for each group from the data objects in the group.

26. The system of claim 25, wherein each data object is associated with only one group.

27. The system of claim 24, further comprising:
means for generating information into a message indicating editable fields corresponding to data objects used in calculating initial and current values that do not match; and
means for generating information into the message that modifications made to the indicated editable fields were not applied.

28. The system of claim 17, wherein the means for calculating the initial value and current value performs a checksum operation on the at least one data object.

29. The system of claim 17, wherein the page comprises one of a Hypertext Markup Language page, Extensible Markup Language (XML) page, an American Standard Code for Information Interchange (ASCII) text file, and Standard Generalized Markup Language (SGML).

30. The system of claim 17, wherein each data object comprises a file in a file system.

31. The system of claim 17, wherein the user program generates a graphical user interface in which the page is rendered and presented.

32. The system of claim 17, wherein the initial value is encoded in the page.

33. An article of manufacture including code for managing accesses to data objects by multiple user programs over a network, wherein the code causes operations to be performed comprising:
generating a page including at least one editable field of data from at least one data object;
calculating an initial value from the at least one data object, said initial value reflecting the initial state of information in said data object;
transmitting the page and the initial value to one user program over the network;
receiving the page and the initial value from the user program, wherein the received page includes modified data in at least one editable field;
calculating a current value from the at least one data object after receiving the page, said current value reflecting the current state of information in said data object;
determining whether the initial value transmitted with the received page is different than the current value; and
if the initial and current values match, updating the data object with the modified data included in the received page.

34. The article of manufacture of claim 33, further comprising:
not updating the data object with the modified data in the received page if the initial and current values do not match.

35. The article of manufacture of claim 34, further comprising:
returning a message to the user program transmitting the page indicating that the modified data in the transmitted page was not applied to the data object.

36. The article of manufacture of claim 33, wherein updating the data object comprises adding the modified data to the content of the data object.

37. The article of manufacture of claim 33, wherein updating the data object comprises adding the modified data to a name of the data object.

38. The article of manufacture of claim 33, wherein the page includes multiple editable fields, wherein each of the editable fields correspond to one of a plurality of data objects, wherein the value is calculated from the plurality of the data objects, whereby a modification to one of the plurality of data objects between a time the initial value and current value are calculated will cause the initial value to differ from the current value.

39. The article of manufacture of claim 38, wherein updating the data object further comprises updating each of the plurality of data objects with the data from the corresponding editable field in the received page, wherein at least one of the editable fields includes modified data.

40. The article of manufacture of claim 33, wherein the page includes multiple editable fields, wherein each of the editable fields corresponds to one of a plurality of data objects,
wherein calculating the initial value further comprises calculating a plurality of initial values, wherein each initial value is calculated from at least one data object corresponding to at least one editable field in the page;
wherein calculating the current value further comprises calculating a plurality of current values, wherein each current value is calculated from at least one data object corresponding to at least one editable field in the page;
wherein determining whether the initial value transmitted with the received page is different than the current value is performed for each of the plurality of initial and current values; and
wherein updating the data object with the modified data included in the received page further comprises updating each data object used in the calculation of the matching initial and current values with the modified data included in the received page.

41. The article of manufacture of claim 40, further comprising:

generating information on groups of the data objects corresponding to editable fields in the page, wherein each group comprises at least one data object corresponding to one editable field in the page, and wherein one initial value is calculated for each group from the data objects in the group.

42. The article of manufacture of claim 41, wherein each data object is associated with only one group.

43. The article of manufacture of claim 40, farther comprising:

generating information into a message indicating editable fields corresponding to data objects used in calculating initial and current values that do not match; and generating information into the message that modifications made to the indicated editable fields were not applied.

44. The article of manufacture of claim 33, wherein the initial value and current value are calculated by performing a checksum operation on the at least one data object.

45. The article of manufacture of claim 33, wherein the page comprises one of a Hypertext Markup Language page, Extensible Markup Language (XML) page, an American Standard Code for Information Interchange (ASCII) text file, and Standard Generalized Markup Language (SGML).

46. The article of manufacture of claim 33, wherein each data object comprises a file in a file system.

47. The article of manufacture of claim 33, wherein the user program generates a graphical user interface in which the page is rendered and presented.

48. The article of manufacture of claim 33, wherein the initial value is encoded in the page.

* * * * *